(12) United States Patent
Tanimura et al.

(10) Patent No.: US 7,542,189 B2
(45) Date of Patent: Jun. 2, 2009

(54) LIGHT SCANNING APPARATUS AND IMAGE FORMING APPARATUS USING THE LIGHT SCANNING APPARATUS

(75) Inventors: Ken Tanimura, Utsunomiya (JP); Hidekazu Shimomura, Yokohama (JP); Tokuji Takizawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 11/533,854

(22) Filed: Sep. 21, 2006

(65) Prior Publication Data

US 2007/0081213 A1 Apr. 12, 2007

(30) Foreign Application Priority Data

Sep. 27, 2005 (JP) ............................. 2005-280432

(51) Int. Cl.
*G02B 26/08* (2006.01)
(52) U.S. Cl. .................................................. 359/205.1
(58) Field of Classification Search ......... 359/205–208, 359/216; 250/339.13
See application file for complete search history.

(56) References Cited

U.S. PATENT DOCUMENTS 5,054,866 A * 10/1991 Tomita et al. ............... 359/201
2004/0239999 A1 12/2004 Tanimura et al. ............ 358/474

FOREIGN PATENT DOCUMENTS

JP 2002-277803 9/2002

* cited by examiner

*Primary Examiner*—Euncha P Cherry
(74) *Attorney, Agent, or Firm*—Fitzpatrick, Cella, Harper & Scinto

(57) ABSTRACT

A light scanning apparatus including a semiconductor laser which emits a light beam having a wavelength equal to or less than 450 nm, an incidence optical system which makes the light beam, emitted from the semiconductor laser, incident on a deflector for scanning in deflection, an imaging optical system which images the light beam scanned in deflection by the deflector to a surface to be scanned, a light intensity detector which detects fluctuations in spectral transmittances of the incidence optical system and of the imaging optical system, which are caused as a concomitant of a fluctuation in wavelength of the light beam which is emitted from the semiconductor laser and passes through the incident optical system and the imaging optical system, and an automatic power controller which automatically controls a light emission output of the semiconductor laser on the basis of a detection value detected by the light intensity detector.

17 Claims, 16 Drawing Sheets

LIGHT SCANNING APPARATUS AND IMAGE FORMING APPARATUS USING THE LIGHT SCANNING APPARATUS

This application claims the benefit of Japanese Patent Application No. 2005-280432, filed Sep. 27, 2005, which is hereby incorporated by reference herein in its entirety.

BACKGROUND OF THE INVENTION

1. Field of the Invention

The present invention relates a light scanning apparatus and an image forming apparatus using this light scanning apparatus, and is suited to an image forming apparatus, such as a laser beam printer and a digital copying machine that have an electrophotographic process, and a multi-function printer.

2. Description of the Related Art

According to the prior art, in a light scanning apparatus, such as a laser beam printer (LBP), light beams optically modulated and emitted from a light source means are periodically deflected by a light deflector (a polygon mirror, etc.) corresponding to image signals. The deflected light beams are converged in a spot-like shape on a photosensitive drum through a light scanning optical system having a characteristic fθ. An image is recorded by scanning with the converged light beam.

FIG. 16 is a principal schematic view of the conventional light scanning apparatus.

Divergent light beams emitted from a light source means 81 are substantially collimated by a collimator lens 83. The collimated light beams are restricted by a stop 82 and are made to be incident on a cylindrical lens 84. The cylindrical lens 84 has a predetermined refracting power only in a sub-scanning direction. In the collimated light beams incident on the cylindrical lens 84, the light beams within a main scanning section emerge therefrom in an as-is state. Further, within a subscanning section, the light beams are converged and form an image substantially as a line image on a deflection surface 85a of a deflection means 85 constructed of a rotary polygon mirror.

Then, the light beams deflected by the deflection surface 85a of the deflection means 85 are guided to a photosensitive drum surface 87 via an imaging optical system 86. Subsequently, the photosensitive drum surface 87 is optically scanned in a direction of an arrowhead B by rotating the deflection means 85 in a direction of an arrowhead A.

In the light scanning apparatus described above, a BD sensor 89 defined as a photo detector is provided for adjusting timing of starting the image formation on the photosensitive drum surface 87 before scanning the photosensitive drum surface 87 by the light spots.

This BD sensor 89 receives BD light beams as part of the light beams reflected in deflection by the light deflector 85. The BD light beam connotes a light beam when scanning an area, excluding an image formation area, before scanning the image formation area on the photosensitive drum surface 87.

The BD light beam is reflected by a BD mirror 88 and becomes, after being converged by a BD lens (not shown), incident upon the BD sensor 89.

Then, a BD signal is detected from an output signal of the BD sensor 89, and the detected BD signal is inputted to an image processing unit 91. The inputted BD signal is taken in synchronism with an image clock for scanning the image. Then, the timing of starting of recording the image is controlled.

The image signal outputted from the image processing unit 91 is outputted to a semiconductor laser operating unit 92 in accordance with the image clock at an image write start timing. Further, information given from photo-diodes disposed in the vicinity of the laser within the semiconductor laser 81 is detected, and APC (Automatic Power Control) is conducted, so that an emission power of the semiconductor laser 81 becomes a standard light intensity from this information.

An effect given by the APC is, however, to control the light intensity from the semiconductor laser 81 to a predetermined value. What is actually required, however, is to control the light intensity on the photosensitive drum surface.

FIG. 17 shows a transmittance characteristic of a general type of glass material. As shown in FIG. 17, generally, the transmittance is substantially constant at 90% or larger up to the vicinity of a visible wavelength of 450 nm from an infrared region. The glass, however, generally absorbs the light in an ultraviolet region, and hence, the wavelength of the transmissible light has a lower limit (an absorption end). The transmittance abruptly decreases in a region where the wavelength is shorter than a wavelength on the order of 450 nm.

By the way, a much higher printing accuracy has been demanded of the apparatus in recent years. There have recently been proposed a variety of light scanning apparatus using a light source that irradiates the light of which the wavelength is shorter than the wavelength of 450 nm, such as a Blue laser (blue-violet semiconductor laser) (see, for example, Japanese Patent Application Laid-Open No. 2002-277803).

A contrivance of Japanese Patent Application Laid-Open No. 2002-277803 is that high color saturation of the print is attained in a way that decreases a size of the light spot formed on the scanned surface by the light scanning apparatus, which involves the use of a light source irradiating the light, of which the wavelength is equal to or shorter than the wavelength of 450 nm.

In the region of the wavelength equal to or less than 450 nm, as described above, a change in the transmittance of the glass material with respect to the change in the wavelength of the semiconductor laser is larger in the conventional infrared region.

Accordingly, when an oscillation wavelength of the laser changes due to a change in temperature, even if the light intensity of the semiconductor laser is kept constant by the APC operation, the light intensity on the photosensitive drum surface does not become constant, due to the change in the transmittance of each optical element. As a result, such a problem arises that reproducibility of the image cannot be preferably maintained.

SUMMARY OF THE INVENTION

It is an object of the present invention to provide a light scanning apparatus capable of preventing a fluctuation in light intensity on a photosensitive drum surface with respect to a fluctuation in environment and a fluctuation in wavelength, keeping preferable reproducibility of an image and satisfying an image quality exhibiting high color saturation, and to provide an image forming apparatus using this light scanning apparatus.

To accomplish the above object, an apparatus comprises control means which controls an output of light source means on the basis of a detection value detected by light intensity detection means, wherein the control means controls an output of the light source means when a temperature changes.

According to the present invention, it is possible to attain the light scanning apparatus capable of preventing the fluctuation in the light intensity on the photosensitive drum surface with respect to the fluctuation in the environment and the fluctuation in the wavelength, preferably keeping the reproducibility of the image and obtaining the image quality exhibiting the high color saturation, and to attain the image forming apparatus using this light scanning apparatus.

Further features of the present invention will become apparent from the following description of exemplary embodiments (with reference to the attached drawings).

DESCRIPTION OF THE EMBODIMENTS

Embodiments of the present invention will hereinafter be described with reference to the drawings.

First Embodiment

Figure 1:
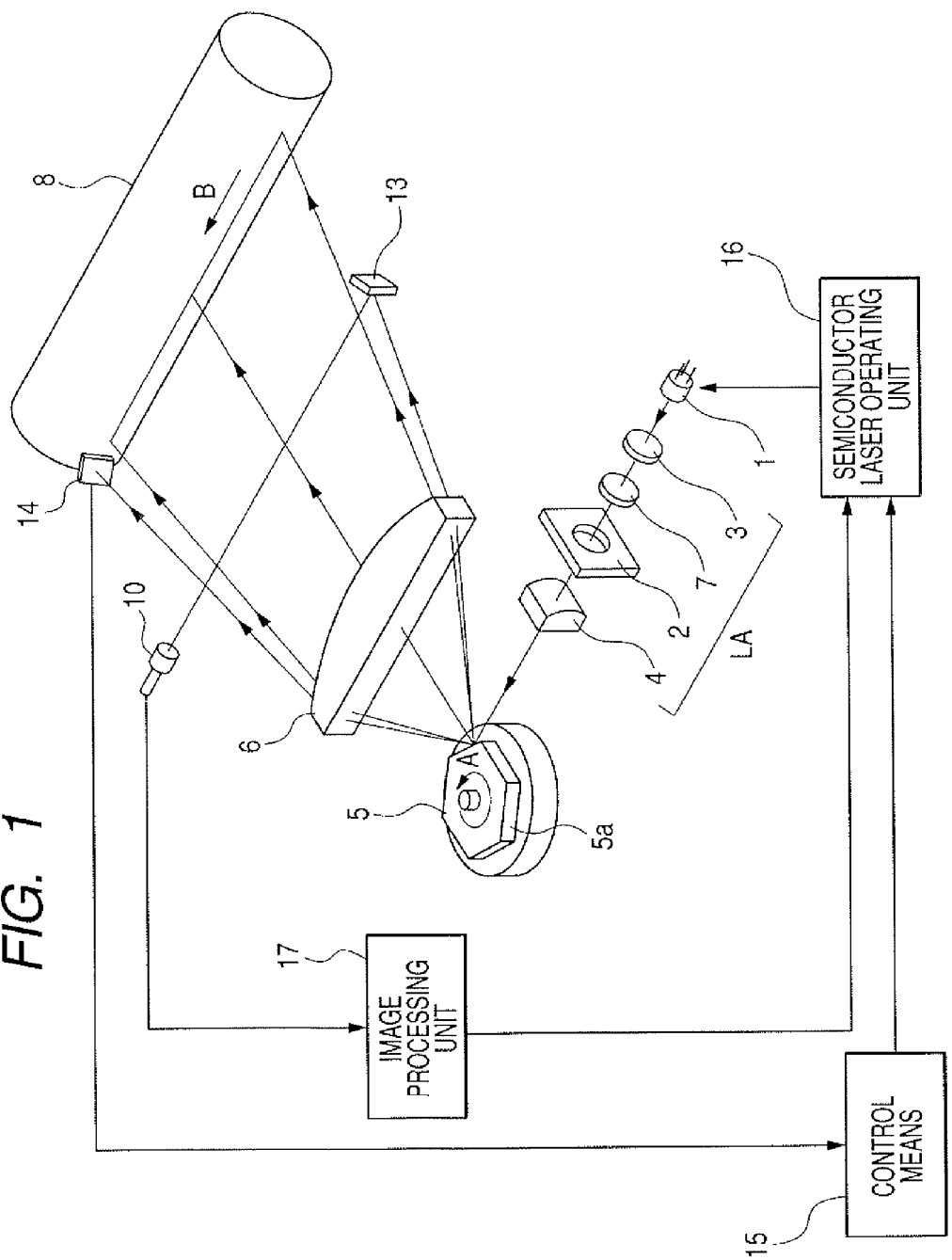
FIG. 1 is a principal schematic view in a first Embodiment of the present invention.

FIG. 1 is a principal view (a principal perspective view) showing an operational principle of a light scanning apparatus in a first Embodiment of the present invention.

It should be noted that, in the following discussion, a main scanning direction connotes a direction perpendicular to an axis of rotation of a rotary polygon mirror and to an optical axis of an imaging optical system. A subscanning direction represents a direction parallel to the axis of rotation of the rotary polygon mirror. Further, a main scanning section defines a plane covering the main scanning direction and the optical axis of the imaging optical system. Further, the subscanning section is a section perpendicular to a main scanning section.

Figures 2A, 2B:
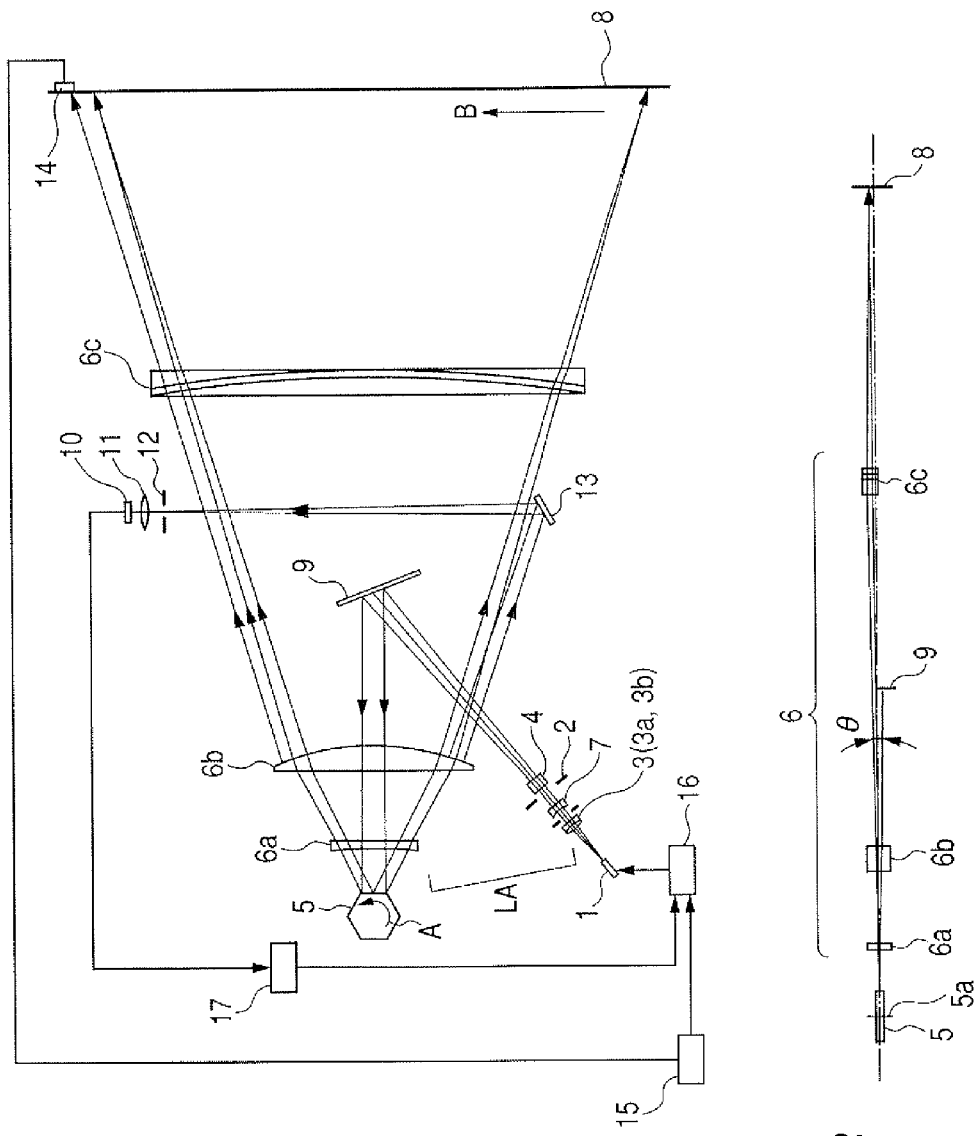
FIGS. 2A and 2B are principal sectional views in the first Embodiment of the present invention.

FIGS. 2A and 2B are principal sectional views each showing a specific example of the first Embodiment of the present invention.

Figure 3:
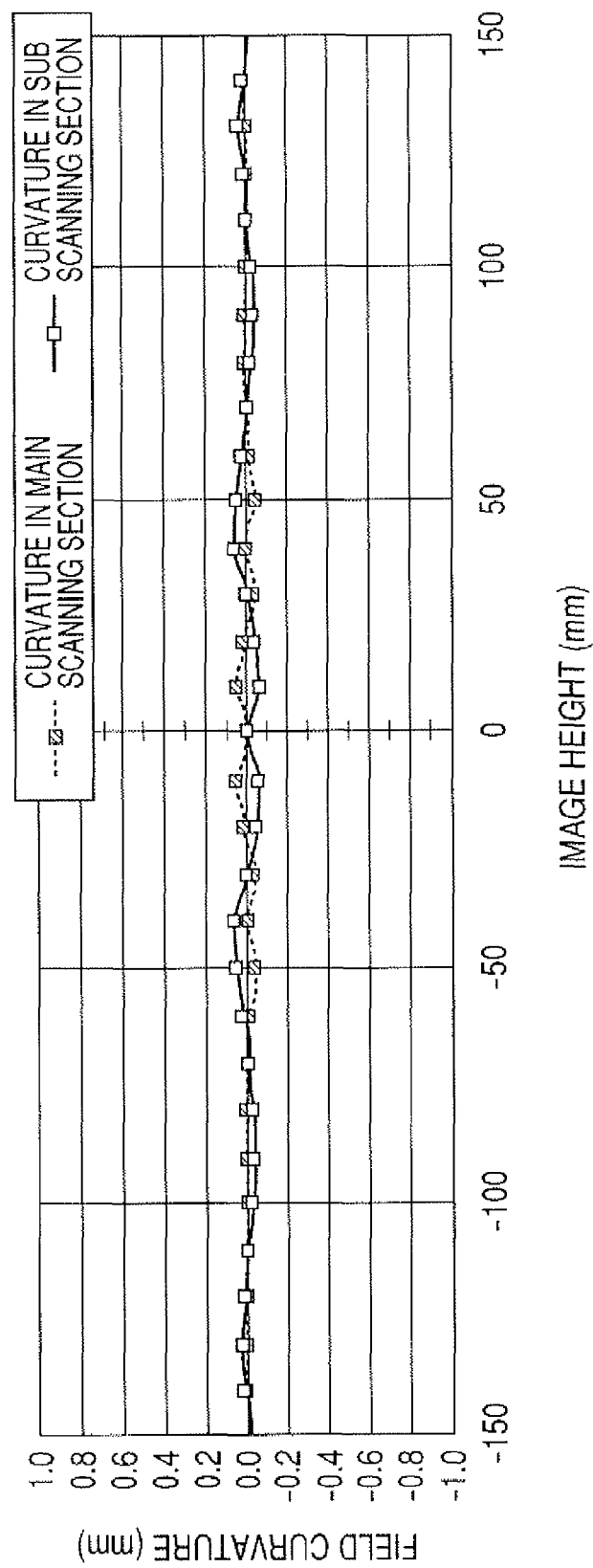
FIG. 3 is a diagram showing a field curvature in the first Embodiment of the present invention.

FIG. 2A is the principal sectional view (the main scanning sectional view) in the main scanning direction, and FIG. 2B is the principal sectional view (the subscanning sectional view) in the subscanning direction. FIG. 3 is a view depicting a field curvature in the main scanning direction and in the subscanning direction in the first Embodiment of the present invention.

In FIGS. 2A and 2B, reference numeral 1 represents a light source means, which is, for instance, a blue-violet color semiconductor laser oscillating light beams of which a wavelength λ is equal to or less than 450 nm (405 nm in the first Embodiment).

Reference numeral 3 designates a first lens (which is a cemented lens of a negative lens 3a and a positive lens 3b) having a positive refracting power (power). The first lens 3 performs a role of collimating the light beams emitted from the semiconductor laser 1.

Reference numeral 7 denotes a second lens (a spherical lens) having a negative refracting power. The second lens 7 performs a role of converting the light beams collimated by the first lens 3 into divergent light beams.

Reference numeral 2 stands for an aperture stop that reshapes a shape of the light beams by restricting the passage of the light beams. Reference numeral 4 represents an optical system (a cylindrical lens) having a positive refracting power within the subscanning section. The optical system 4 performs a role of forming an image, substantially as a line image, the light beams passing through the aperture stop 2 on a deflection surface 5a of a light deflector 5, which will be explained later on, within the subscanning section.

Reference numeral 9 represents a folding mirror (retro-reflection mirror). The folding mirror 9 performs a role of folding a light path of the light beams passing through the cylindrical lens 4 toward the optical deflector 5.

Note that the respective components such as the first lens 3, the second lens 7, the aperture stop 2, the cylindrical lens 4, the folding mirror 9, and first and second imaging lenses 6a, 6b, which will be described later on, configure part of a first optical system (incidence optical system) LA.

Moreover, an a focal system is built up by four pieces of lenses, such as the second lens 7, the cylindrical lens 4, the first imaging lens 6a and the second imaging lens 6b, which will hereinafter be explained within the main scanning section.

Reference numeral 5 designates the optical deflector (the polygon mirror) defined as a deflection means, and is rotated at a fixed speed in a direction of an arrowhead A in FIG. 2 about an axis-of-rotation 5a by a driving means (not shown), such as a motor.

Reference numeral 6 stands for a second optical system (an imaging optical system) having a characteristic fθ, and includes the first imaging lens 6a, the second imaging lens 6b and a third imaging lens 6c. The first imaging lens 6a is a spherical lens composed of a glass lens, and the second imaging lens 6b is a cylindrical lens composed of a glass lens. The first and second imaging lenses 6a, 6b perform a role of establishing compatibility between the field curvature in the main scanning direction and the characteristic fθ.

The third imaging lens 6c is a plastic lens. The third imaging lens 6c is an anamorphic lens having powers different from each other in the main scanning direction and in the subscanning direction. This anamorphic lens satisfies the field curvature in the subscanning direction.

Moreover, the first and second imaging lenses 6a, 6b also configure part of the first optical system LA. Reference numeral 8 represents a photosensitive drum surface serving as a surface to be scanned.

Reference numeral 13 denotes a reflex mirror (which will hereinafter be referred to as a (BD mirror)) disposed on a scanning line in the main scanning direction. The BD mirror 13 performs a role of reflecting the light beams (BD light beams) for synchronous detection for adjusting timing of a scan start position on the photosensitive drum surface 8, toward a synchronous detection element 10.

Reference numeral 12 represents a slit (which will hereinafter be termed a "BD slit") for the synchronous detection. The slit 12 is disposed in a position equivalent to the photosensitive drum surface 8 and determines an image write starting position.

Reference numeral 11 designates a condenser lens (which will hereinafter be referred to as a "BD lens"). The BD lens 11 serves to provide a conjugate relation between the BD mirror 13 and a BD sensor 10 that will be explained later on. The condenser lens 11 compensates for surface-down of the BD mirror 13.

Reference numeral 10 stands for an optical sensor (which will also hereinafter be referred to as a "BD sensor") serving as the synchronous detection element. In the first Embodiment, the timing of the scan start position for recording the image on the photosensitive drum surface 8 is adjusted by use of a synchronous signal (a BD signal) obtained by detecting an output signal from the BD sensor 10.

It should be noted that the respective components, such as the BD slit 12, the BD lens 11 and the BD sensor 10, configure part of a write starting position detecting optical system (BD optical system).

Reference numeral 14 represents a light intensity detection sensor (photo detector) serving as a light intensity detection means. The light intensity detection sensor 14 detects fluctuations in spectral transmittances of the incidence optical system LA and of the imaging optical system 6, which are caused as a concomitant of a fluctuation in the wavelength of the light beams emitted from the semiconductor laser 1.

The light intensity detection sensor 14 is disposed on the photosensitive drum surface 8 or in a position conjugate to the photosensitive drum surface 8 and disposed outside an effective scanning area.

In the first Embodiment, when finishing writing the image on the photosensitive drum surface 8 (or when starting the writing of the image), a light intensity (a quantity of light) is measured as the light beams travel through the light intensity detection sensor 14, thereby detecting the fluctuations in the spectral transmittances of the incidence optical system LA and of the imaging optical system 6.

Reference numeral 15 designates a control means. The control means 15 controls (APC) the output of the semiconductor laser 1 to reach a standard light intensity on the basis of a detection value detected by the light intensity detection sensor 14. Reference numeral 16 denotes a semiconductor laser operating unit. The semiconductor laser operating unit 16 drives the semiconductor laser 1 on the basis of a signal transmitted from the control means 15 or from an image processing unit 17 that will hereinafter be described later on.

The image processing unit 17 detects the BD signal from the output signal of the BD sensor 10, and takes synchronism with an image clock for scanning the image. Then, the timing control for starting recording of the image is conducted via the semiconductor laser operating unit 16.

The light beams emitted in modulation from the semiconductor laser 1 are collimated by the first lens 3. Thereafter, the collimated light beams are converted into the divergent light beams by the second lens 7, and subsequently, the light beams are restricted by the aperture stop 2 and are made incident on the cylindrical lens 4.

In the light beams incident upon the cylindrical lens 4, the light beams within the subscanning section become, after being converged and passing through the second imaging lens 6b and the first imaging lens 6a, incident on a deflecting surface 5a of the light deflector 5. An image of the light beams is formed as a longitudinal line image in the main scanning direction in the vicinity of the deflecting surface 5a.

At this time, the light beams incident on the deflecting surface 5a are made incident at an oblique incident angle of 0.8 degree to the plane perpendicular to the axis of rotation of the light deflector 5 from within the subscanning section including the axis of rotation of the light deflector 5 and the optical axis of the second optical system 6, thereby splitting the incident light beams and the deflection light beams.

Note that the light source means 1 and the incidence optical system LA shall exist within the main scanning section, for simplicity, in FIG. 1.

Moreover, the light beams within the main scanning section become divergent and pass through the second imaging lens 6b and the first imaging lens 6a, and are, thereby, collimated. Thereafter, the light beams are incident upon the center of an angle of deflection of the light deflector 5 or upon the deflecting surface 5a substantially from the center. At this time, a beam width of the collimated light beams is set sufficiently large for a facet width of the deflecting surface 5a of the light deflector 5 in the main scanning direction. Then, the light beams reflected in deflection by the deflecting surface 5a of the light deflector 5 are guided to the photosensitive drum surface 8 via the first, second and third imaging lenses 6a, 6b, 6c. The photosensitive drum surface 8 is scanned by the light beams in a direction of an arrowhead B (in the main scanning direction) by rotating the light deflector 5 in the direction of the arrowhead A. With this scan, the image is recorded on the photosensitive drum surface 8 defined as a recording medium.

At this time, before scanning the photosensitive drum surface 8 with the light spots, the timing of starting of the image formation on the photosensitive drum surface 8 is adjusted.

For attaining this, the BD sensor 10 receives the BD light beams as part of the light beams reflected in deflection by the light deflector 5. The BD light beams are reflected by the BD mirror 13, and the light intensity thereof is restricted by the BD slit 12. Then, the BD light beams are converged by the BD lens 11 and become incident upon the BD sensor 10.

Then, the BD signal is detected from the output signal of the BD sensor 10, and the timing of starting of recording of the image on the photosensitive drum surface 8 is adjusted based on this BD signal.

Table 1 shows an optical layout and shapes of the respective lenses. Table 2 shows names of glass materials and Abbe numbers thereof in the first Embodiment.

TABLE 1

| wavelength in use | $\lambda$ (nm) | 405 |
|---|---|---|
| scan angle | $\theta$ (deg) | 50.41 |
| coefficient f$\theta$ | f | 340.99 |

TABLE 1-continued layout of incidence system

| | | |
|---|---|---|
| distance between light source and cemented lens | d1 (mm) | 33.04 |
| central thickness of cemented lens (concave) | d2 (mm) | 2.04 |
| central thickness of cemented lens (convex) | d3 (mm) | 3.00 |
| distance between cemented lens and spherical lens | d4 (mm) | 10.02 |
| central thickness of spherical lens | d5 (mm) | 5.00 |
| distance spherical lens and cylindrical lens | d6 (mm) | 19.04 |
| central thickness of cylindrical lens | d7 (mm) | 6.00 |
| distance between cylindrical lens and deflecting surface | d8 (mm) | 346.48 | scan system layout

| | | |
|---|---|---|
| distance between deflecting surface and spherical lens | D1 (mm) | 19.87 |
| central thickness of spherical lens | D2 (mm) | 4 |
| distance between spherical lens and cylindrical lens | D3 (mm) | 41.5 |
| central thickness of cylindrical lens | D4 (mm) | 27.90 |
| distance between cylindrical lens and anamorphic lens | D5 (mm) | 228.41 |
| central thickness of anamorphic lens | D6 (mm) | 4.00 |
| distance between anamorphic lens and scanned surface | D7 (mm) | 157.39 |

| | meridian line R | | sagittal line R | |
|---|---|---|---|---|
| | first surface | second surface | first surface | second surface |
| cemented lens (concave) | −17.58 | −74.21 | | |
| cemented lens (convex) | 22.95 | −17.58 | | |
| spherical lens | −56.34 | ∞ | −56.34 | ∞ |
| cylindrical lens | ∞ | ∞ | 48.15 | ∞ |

| | shape of spherical lens | | shape of cylindrical lens | |
|---|---|---|---|---|
| | first surface | second surface | first surface | second surface |
| R | −338.563 | ∞ | ∞ | −152.570 |
| r | — | — | ∞ | ∞ |

| | shape of anamorphic lens | |
|---|---|---|
| | first surface | second surface |
| R | −1000.000 | −1000.000 |
| r | 141.115 | −110.305 |

TABLE 2

| | name of glass material | Abbe number (vd) |
|---|---|---|
| cemented lens (concave) | s-tih4 (OHARA) | 27.51 |
| cemented lens (convex) | s-bsm81 (OHARA) | 60.07 |
| spherical lens | s-bs17 (OHARA) | 64.14 |
| cylindrical lens | s-bs17 (OHARA) | 64.14 |
| spherical lens | s-tih11 (OHARA) | 25.68 |
| cylindrical lens | s-bah27 (OHARA) | 41.24 |
| anamorphic lens | E48R (ZEONEX) | 55.50 |

In a commercially-available blue laser having a wavelength of 405 nm, when a temperature in the vicinity of the laser rises by twenty degrees, the wavelength of the laser changes by 1 nm or more. At this time, the fluctuations in the transmittances of the negative lens 3a, the positive lens 3b, the spherical lens 7, the cylindrical lens 4, the first imaging lens 6a, the second imaging lens 6b and the third imaging lens 6c are sequentially given such as 0.48%, 0.03%, 0.02%, 0.02%, 0.65%, 0.35%, 0.02%, respectively. Moreover, the light beams from the semiconductor laser 1 pass through twice each of the first and second imaging lenses 6a, 6b, and hence, the fluctuation on the order of 2.55% occurs on the photosensitive drum surface 8.

Generally, it is required that the fluctuation in the intensity of light incident on the photosensitive drum surface 8 be within 0.5% in order to satisfy reproducibility of a high image quality of a photo, etc.

Figure 4:
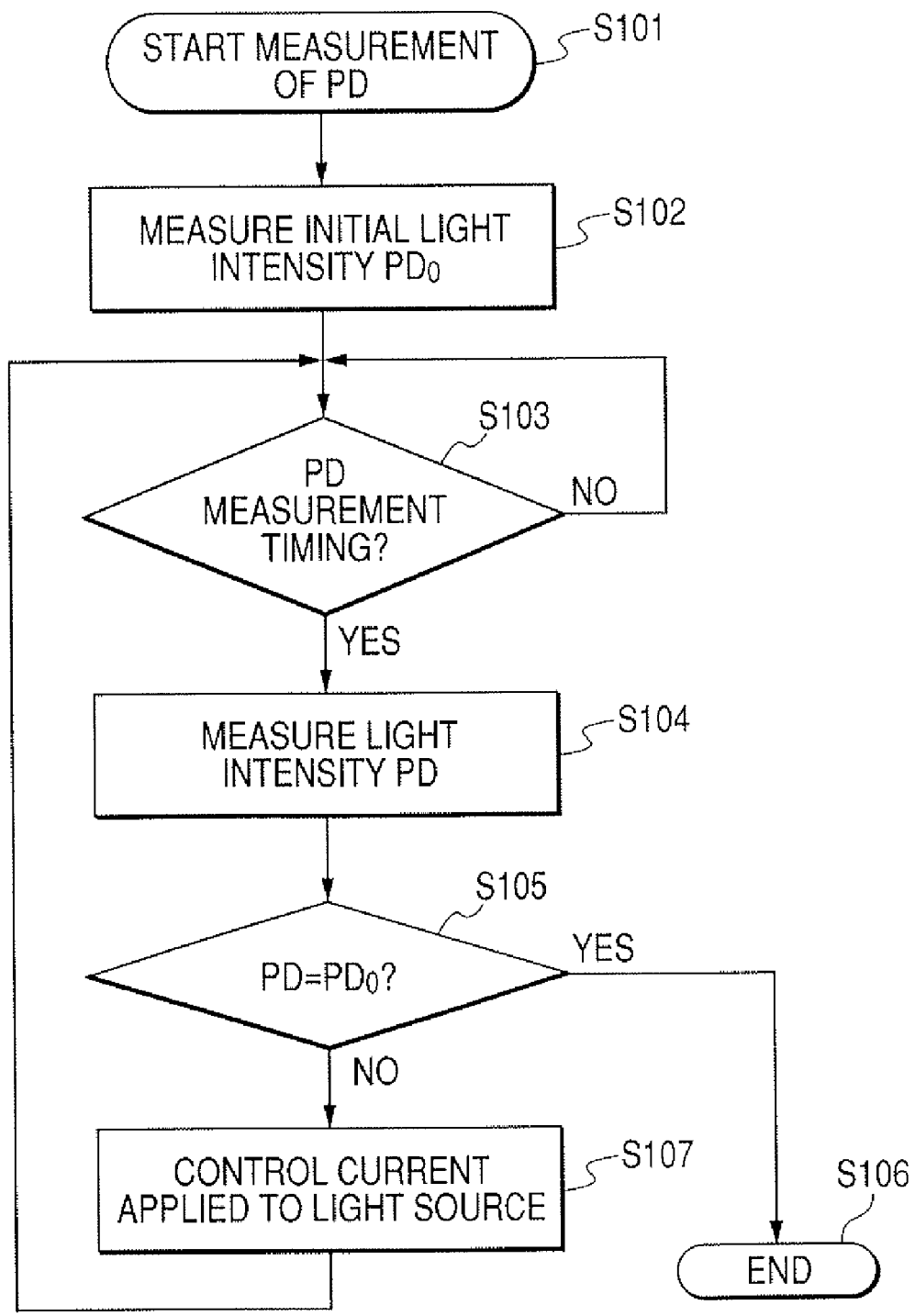
FIG. 4 is a flowchart of an APC control flow in the first Embodiment of the present invention.

Such being the case, in the first Embodiment, the control, as shown in a flowchart illustrated in FIG. 4, is conducted.

S101: Measurement of PD is started.
S102: An initial PD light intensity is measured.
S103: A judgment is made as to whether it is PD measurement timing or not.
S104: When reaching the judgment timing, a present light intensity is measured.
S105: The light intensity detection sensor 14 compares a detected light intensity PD with an initial light intensity $PD_0$.
S106: If there is no difference between PD and $PD_0$, the operation comes to an end.
S107: If there is the difference in the light intensity, the control means 15 controls an applied current of the laser so as to reach a predetermined light intensity on the photosensitive drum surface 8.

Conducted in this way is the APC operation, taking account of the fluctuation in the transmittance when traveling through the glass material.

The procedures described above are repeated until the intensities PD, $PD_0$ are equalized, hereby restraining, within 0.5%, the fluctuation in the light intensity on the photosensitive drum surface 8. It is to be noted that the light intensity detection sensor 14 and the BD sensor 10 are separately provided in the first Embodiment, however, without being limited to this configuration, such a configuration may be taken that, for example, the BD sensor 10 is provided with a means capable of detecting the light intensity or the light intensity detection sensor 14 is provided with a means capable of detecting the BD light beams. This configuration enables the number of components to be reduced.

Second Embodiment

Figure 5:
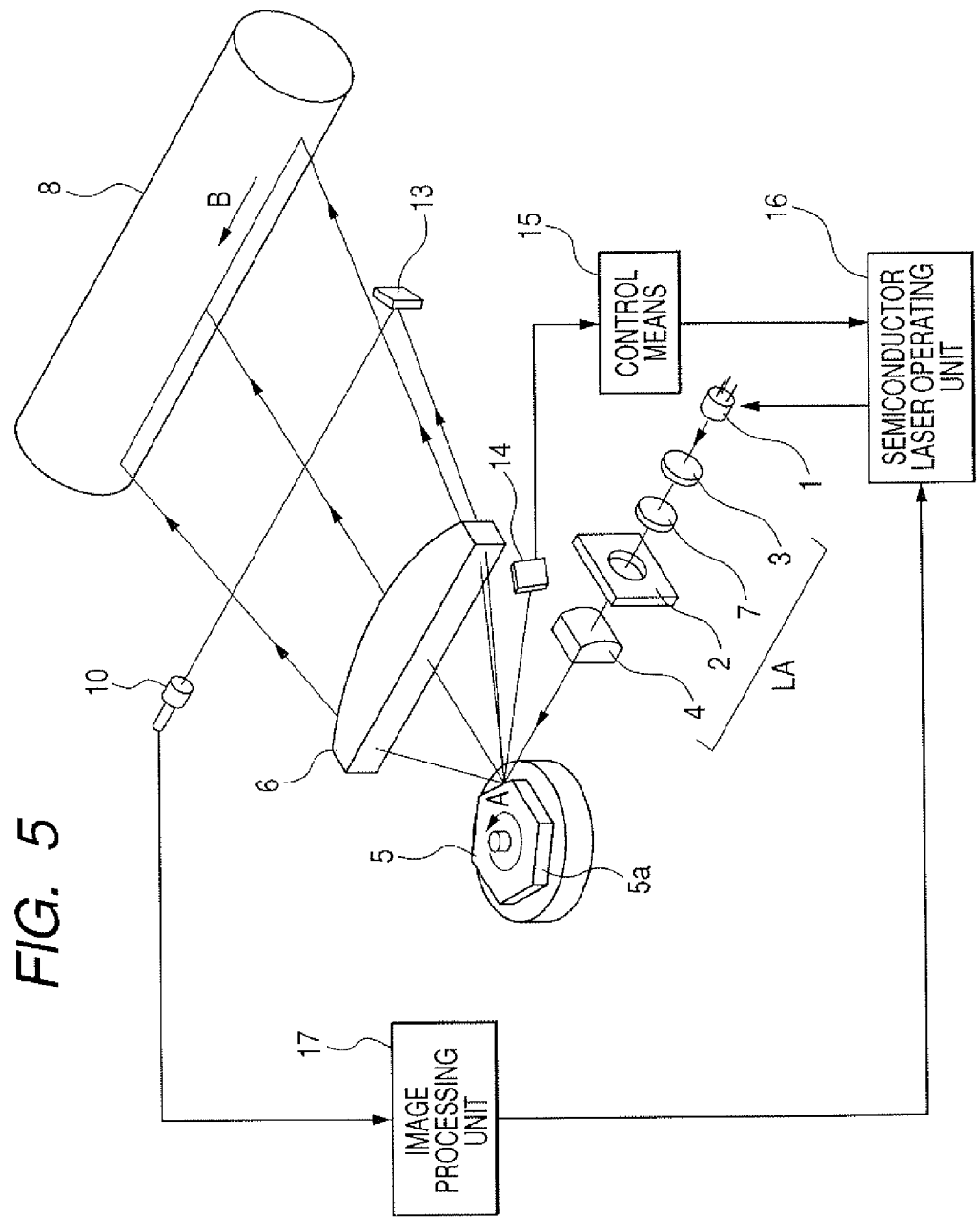
FIG. 5 is a principal schematic view in a second Embodiment of the present invention.
Figure 6:
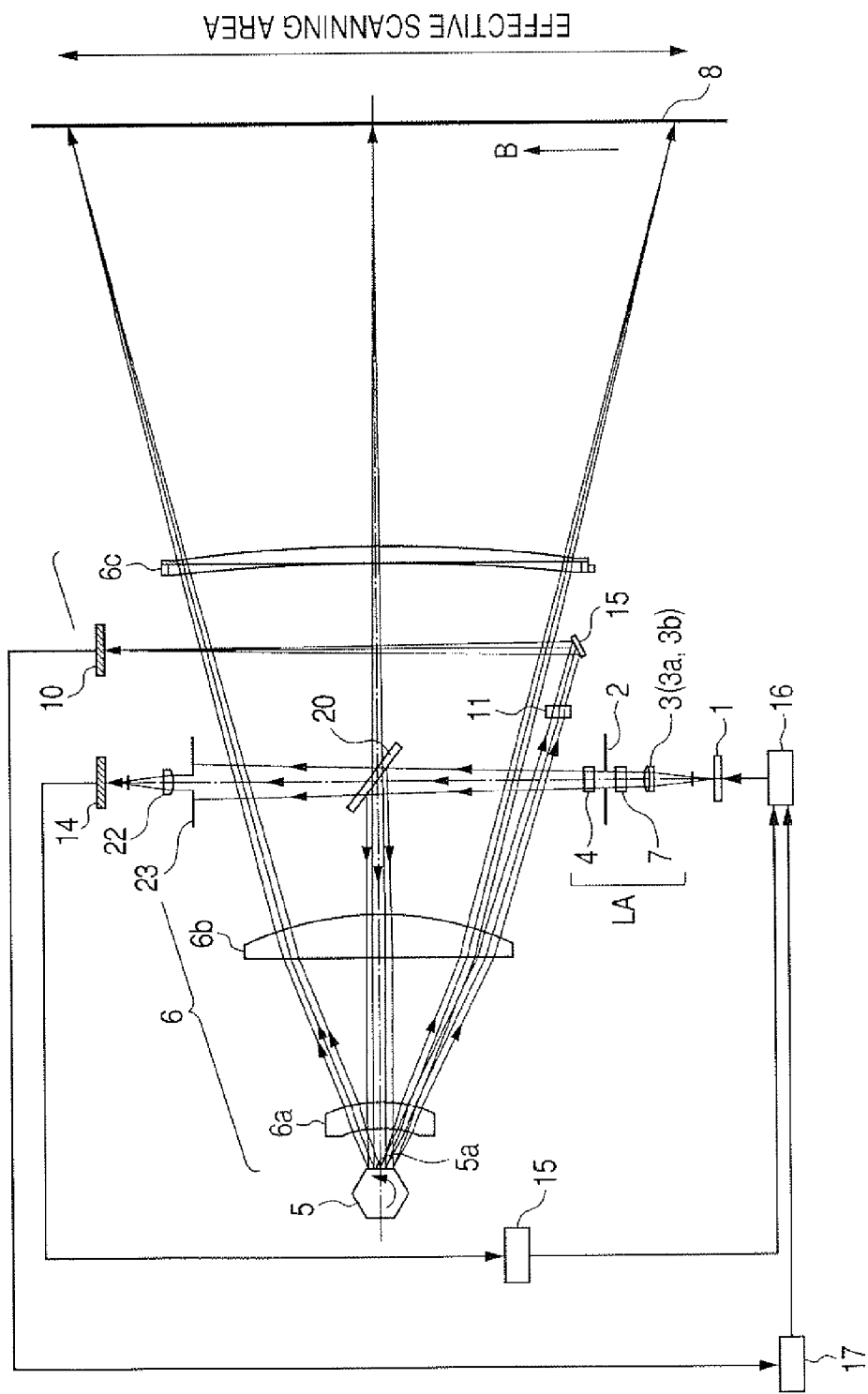
FIG. 6 is a principal sectional view in the second Embodiment of the present invention.
Figure 7:
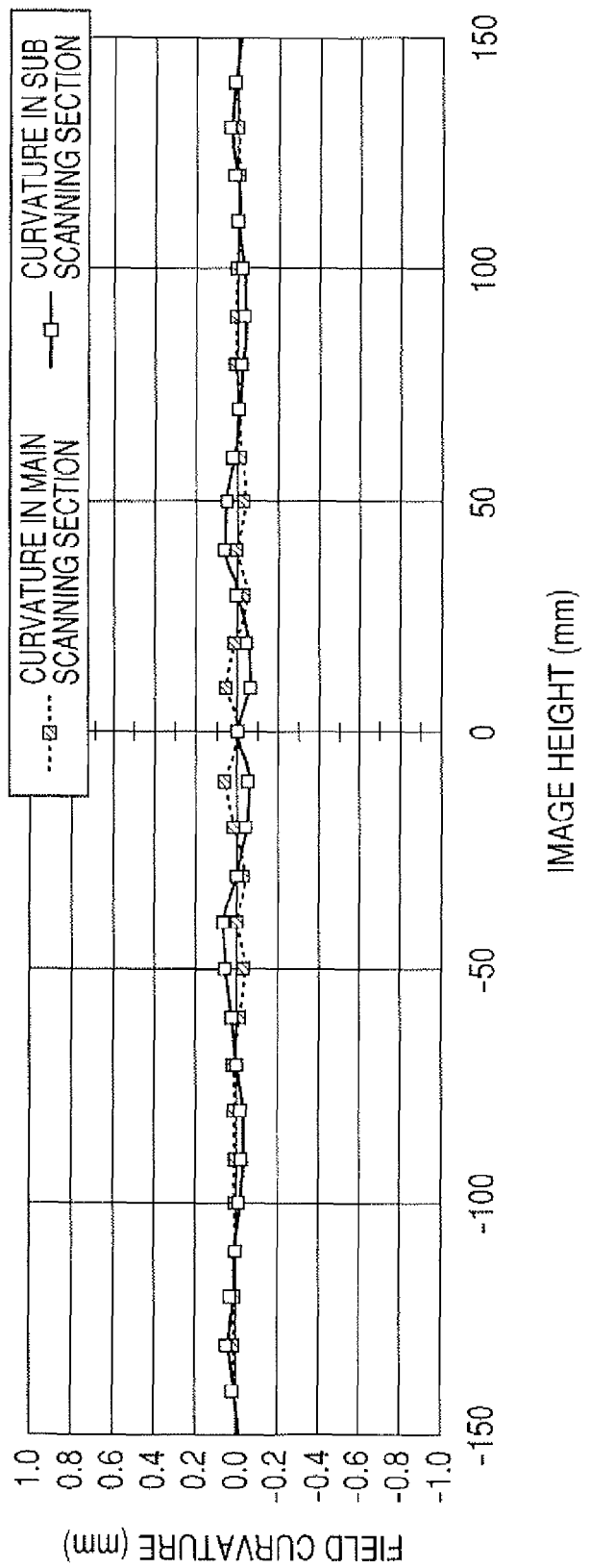
FIG. 7 is a graph showing the field curvature in the first Embodiment of the present invention.

FIG. 5 is a principal view showing the principle of the light scanning apparatus in a second Embodiment of the present invention. FIG. 6 is a principal sectional view illustrating a specific example of the second Embodiment of the present invention. FIG. 7 is a graph showing field curvatures in the main scanning direction and in the subscanning direction in the second Embodiment of the present invention. In FIGS. 5 and 6, the same components as those depicted in FIGS. 1 and 2 are marked with the same numerals.

A different point of the second Embodiment from the first Embodiment discussed above is that the light intensity detection light beams deflected by the light deflector 5 are guided to the light intensity detection sensor 14 without passing through the imaging optical system 6. For example, the light intensity detection sensor 14 is disposed between the light paths of the light source means 1 and of the light deflector 5 (FIG. 6), or disposed in a position for detecting the light beams between the light paths of the light source means 1 and of the imaging optical system 6 (FIG. 5). Other configurations and optical action are substantially the same as those in the first Embodiment.

The detection of the light intensity involves the necessity for irradiating the surface of the light intensity detection sensor 14 with the light beams for a fixed period of time. In the case of a scanning optical system exhibiting a very high scanning speed over the photosensitive drum surface 8, if the light intensity detection sensor 14 for detecting the light intensity exists in the vicinity of the photosensitive drum surface 8, there is a case in which the light intensity cannot be precisely detected because of a short period of time for which to pass through the light intensity detection sensor 14.

Such being the case, in the second Embodiment, the light intensity detection sensor 14 for detecting the fluctuation in the spectral transmittance of the incidence optical system LA, which is caused as the concomitant of the fluctuation in the wavelength of the light beams emitted from the semiconductor laser 1, is disposed in the position depicted in FIG. 5 or FIG. 6.

In FIG. 6, the light intensity detection sensor 14 is disposed in the position for detecting the light beams between the light paths of the semiconductor laser 1 and of the light deflector 5. In FIG. 5, the light intensity detection sensor 14 is disposed between the light paths of the light source means 1 and of the imaging optical system 6. With this configuration, the light intensity detecting accuracy is improved.

In FIG. 6, the reflected light beams pass through the imaging optical system 6 and travel toward the photosensitive drum surface 8 via a half mirror 20 provided between the cylindrical lens 4 and the polygon mirror 5. On the other hand, the transmitted light beams are, after passing through a stop 23, converged by a spherical lens 22 and become incident on the light intensity detection sensor 14, wherein the light intensity is measured.

In FIGS. 5 and 6, the light intensity detected by the light intensity detection sensor 14 does not reflect the fluctuation in the transmittance of the imaging optical system 6. This being the case, in the second Embodiment, a material of the imaging optical system 6 is properly selected.

In general, a transmittance T of the glass material can be generally expressed as follows:

$$T = \exp(-4\pi k \cdot d / \lambda) \quad (1)$$

where d is a thickness of the glass material, and k is called an extinction coefficient.

An absorption end of the glass employed for the lens is required to be set on the side of a short wavelength in order for the short-wavelength light beams to penetrate the lens, and is small in dispersion of the glass. Namely, the absorption end exists on the shorter wavelength side, as a wavelength dependency of a refractive index of the glass becomes smaller. It is desired that the dispersion of the glass be small, in order to obtain high transmittance also in the short wavelength light beams.

Figure 8:
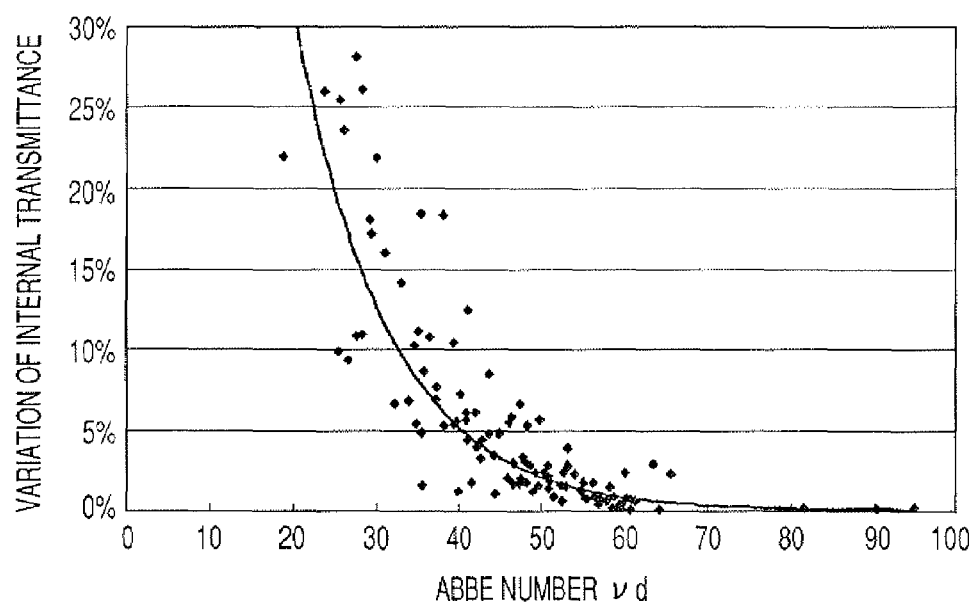
FIG. 8 is a graph showing a relationship between an Abbe number and a change in transmittance in a short wavelength region of an optical glass.

FIG. 8 shows an Abbe number ν of a commercially available optical glass and a fluctuation quantity of the transmittance when the wavelength changes from 395 nm to 420 nm. The data in FIG. 8 are obtained in a way that takes the glass manufactured by Ohara Corp. for reference.

As is obvious from FIG. 8, there is less fluctuation in the transmittance in the vicinity of the wavelength of 405 nm as the Abbe number ν of the glass material becomes larger. Further, as is apparent from the relational expression (1) given above, the transmittance T becomes smaller, accordingly, as the glass material becomes thicker.

Generally, the thickness of the lens configuring the incidence optical system LA is on the order of 3 mm through 5 mm. As compared with this, the thickness of the lens configuring the imaging optical system 6 becomes comparatively as thick as 5 mm-10 mm, in order to make preferable both of the characteristic fθ and the quantity of the field curvature.

Therefore, a scatter in the light intensity on the photosensitive drum surface 8 is not so improved, even when the light intensity is kept constant by increasing the Abbe number of the glass material that forms the imaging optical system 6, and by performing the APC operation with the transmitted light intensity of only the incidence optical system LA.

It is considered to be desirable from FIG. 8 that there is a small fluctuation in the transmittance of the imaging optical system 6 due to the fluctuation in the wavelength, if the Abbe number of the material of each of the imaging lenses configuring the imaging optical system 6 is equal to or greater than forty.

Such being the case, in the second Embodiment, as shown in Table 4 given below, the glass materials each exhibiting an Abbe number that is equal to or greater than forty are used for the first, second and third imaging lenses 6a, 6b, 6c, serving as the refraction optical elements building up the imaging optical system 6, thereby solving the problem described above.

Table 3 shows the optical layout and the shapes of the respective lenses in the first Embodiment of the present invention. Table 4 shows the names of the glass materials of the respective lenses and the Abbe numbers thereof in the second Embodiment.

TABLE 3

| | | |
|---|---|---|
| wavelength in use | λ (nm) | 405 |
| scan angle | θ (deg) | 50.41 |
| coefficient fθ | f | 337.43 |
| layout of incidence system | | |
| distance between light source and cemented lens | d1 (mm) | 33.04 |
| central thickness of cemented lens (concave) | d2 (mm) | 2.04 |
| central thickness of cemented lens (convex) | d3 (mm) | 3.00 |
| distance between cemented lens and spherical lens | d4 (mm) | 10.02 |
| central thickness of spherical lens | d5 (mm) | 5.00 |
| distance spherical lens and cylindrical lens | d6 (mm) | 19.04 |
| central thickness of cylindrical lens | d7 (mm) | 6.00 |
| distance between cylindrical lens and deflecting surface | d8 (mm) | 346.48 |
| scan system layout | | |
| distance between deflecting surface and spherical lens | D1 (mm) | 26.86 |
| central thickness of spherical lens | D2 (mm) | 14.15 |
| distance between spherical lens and toric lens | D3 (mm) | 50.08 |
| central thickness of toric lens | D4 (mm) | 21.74 |
| distance between toric lens and anamorphic lens | D5 (mm) | 163.57 |
| central thickness of anamorphic lens | D6 (mm) | 7.50 |
| distance between anamorphic lens and scanned surface | D7 (mm) | 165.39 |

| | meridian line R | | sagittal line R | |
|---|---|---|---|---|
| | first surface | second surface | first surface | second surface |
| cemented lens (concave) | −17.58 | −74.21 | | |
| cemented lens (convex) | 22.95 | −17.58 | | |
| spherical lens | −56.34 | ∞ | −56.34 | ∞ |
| cylindrical lens | ∞ | ∞ | 48.15 | ∞ |

| | shape of spherical lens | | shape of cylindrical lens | |
|---|---|---|---|---|
| | first surface | second surface | first surface | second surface |
| R | −89.588 | −88.863 | ∞ | −226.618 |
| r | — | — | −159.940 | |

| | shape of anamorphic lens | |
|---|---|---|
| | first surface | second surface |
| R | −1126.436 | −853.015 |
| r | ∞ | −93.762 |

TABLE 4

| | name of glass material | Abbe number (vd) |
|---|---|---|
| cemented lens (concave) | s-tih4 (OHARA) | 27.51 |
| cemented lens (convex) | s-bsm81 (OHARA) | 60.07 |
| spherical lens | s-bs17 (OHARA) | 64.14 |
| cylindrical lens | s-bs17 (OHARA) | 64.14 |
| spherical lens | s-bsm14 (OHARA) | 60.64 |
| toric lens | s-bs17 (OHARA) | 64.14 |
| anamorphic lens | E48R (ZEONEX) | 55.50 |

In the second Embodiment, as compared with the first Embodiment, the fluctuation in the transmittance of the imaging optical system 6 is restrained down to 0.28%, even when the wavelength changes by 1 nm or greater in a way that changes the glass materials of the first imaging lens 6a and of the second imaging lens 6b to s-bsm14 (Abbe number: 60.64) and to s-bsl7 (Abbe number: 64.14).

With this contrivance, there is a small fluctuation in the light intensity on the photosensitive drum surface 8, even by performing the APC control in a way that detects the light intensity after passing through the imaging optical system 6.

Moreover, over the recent years, in many cases, a resinous lens having an aspherical shape owing to injection molding has been used for the imaging optical system 6, because it is easy to manufacture, and for further improving the optical performance.

Figure 9:
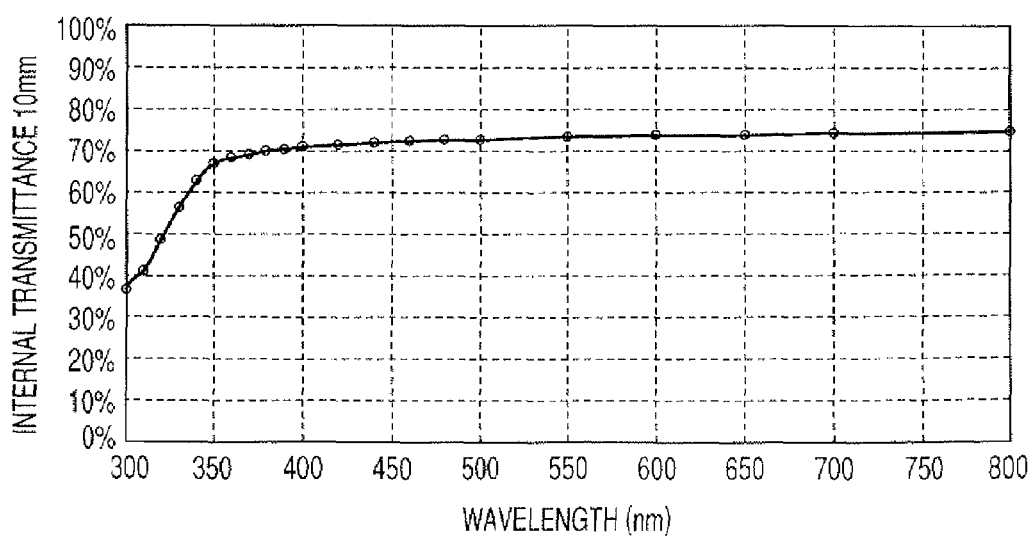
FIG. 9 is a graph showing a resin wavelength-transmittance characteristic.

FIG. 9 shows the fluctuation in the transmittance with respect to the wavelength of ZEONEX 480R (Abbe number: 56.2 (25° C., d-line)) of which the thickness is 10 nm.

As is obvious from FIG. 9, the fluctuation in the spectral transmittance is smaller than the glass, of which the Abbe number is small, in a short-wavelength area. The resin exhibiting such a wavelength characteristic is chosen for the imaging lens, thereby making it possible to prevent any change of the light intensity on the photosensitive drum surface 8.

Third Embodiment

Figure 10:
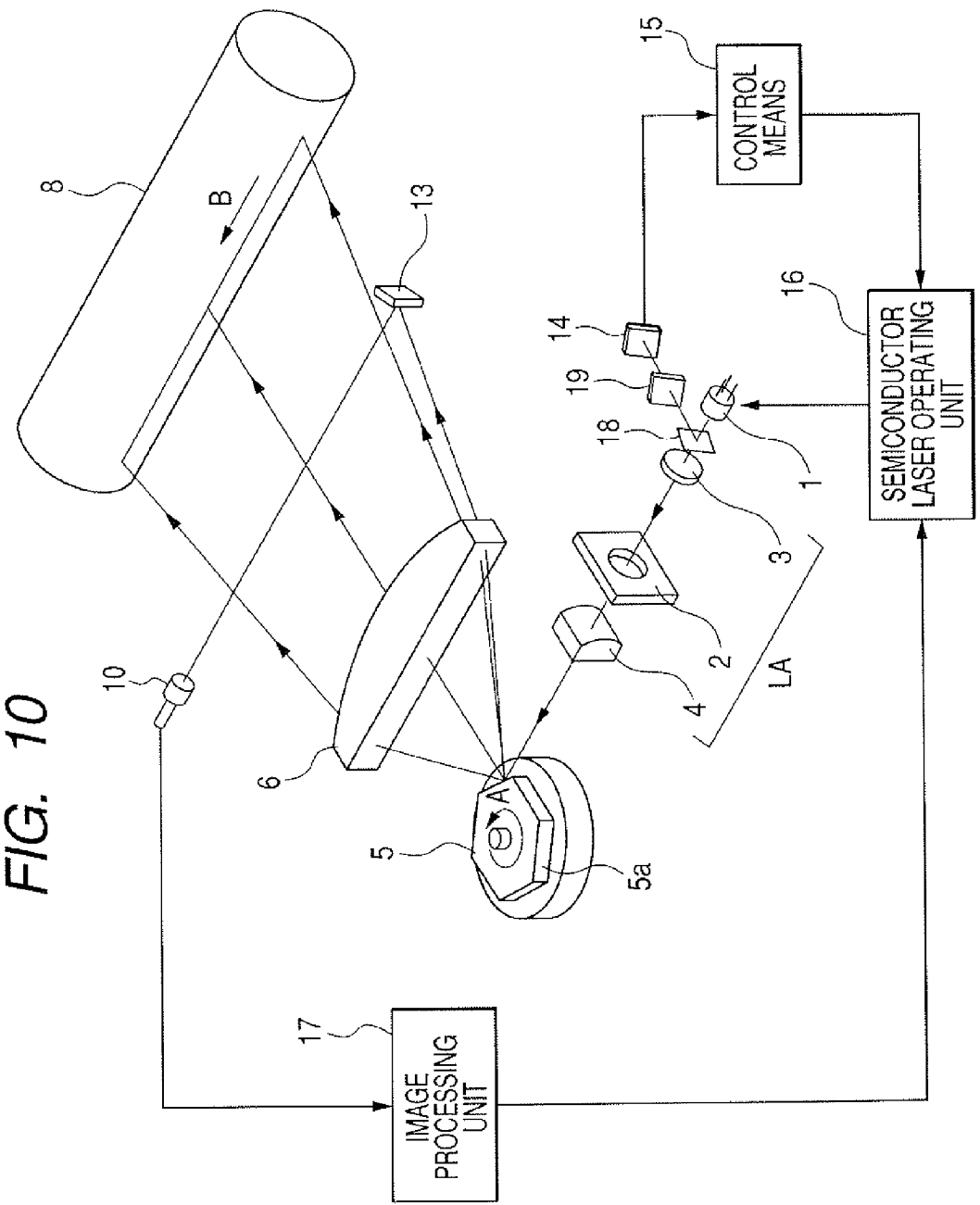
FIG. 10 is a principal schematic view in a third Embodiment of the present invention.

FIG. 10 is a principal perspective view of the light scanning apparatus in a third Embodiment of the present invention. In FIG. 10, the same components as those depicted in FIG. 1 are marked with the same numerals.

A different point of the third Embodiment from the second Embodiment is that the configuration for detecting the light intensity is simplified. Therefore, the light intensity detection sensor 14 is disposed in the vicinity of the semiconductor laser 1, and a correction plate 19 is disposed anterior to the light intensity detection sensor 14.

Other configurations and optical action are substantially the same as those in the second Embodiment, whereby the same effects are acquired.

In FIG. 10, reference numeral 18 represents a half mirror serving as a beam splitting means. The half mirror 18 is provided in the light path between the semiconductor laser 1 and the incidence optical system LA. The half mirror 18 performs a role of splitting the light beams emitted from the semiconductor laser 1 into two fluxes of light, i.e., the transmitted light and the reflected light, and directing the transmitted light toward the photosensitive drum surface 8 and the reflected light toward the light intensity detection sensor 14.

Reference numeral 19 designates the correction plate disposed in the light path between the half mirror 18 and the light intensity detection sensor 14. The correction plate 19 has an optical characteristic that is substantially the same as or proportional to the fluctuation in the spectral transmittance of each of the incidence optical system LA and the imaging optical system 6, which is caused as the concomitant of the fluctuation in the wavelength of the light beams emitted from the semiconductor laser 1.

In the third Embodiment, in many cases, the first lens 3 involves using a material having a high refractive index for making preferable a wave front aberration of the collimated light beams to be emitted. This type of glass material has an Abbe number that is comparatively small, as low as forty or less.

Further, if a glass material capable of achromatizing with the incidence optical system LA is selected in order to restrain a fluctuation in focus on the photosensitive drum surface 8 due to the fluctuation in the wavelength of the semiconductor laser 1, it follows that a material combination is a combination of a material exhibiting a large Abbe number and a material exhibiting a small Abbe number.

Then, in the third Embodiment, the light intensity detection sensor 14 is disposed in the vicinity of the semiconductor laser 1, as described above. Even in the case of conducting the APC operation, the correction plate 19 having the above-mentioned optical characteristic is disposed anterior to the light intensity detection sensor 14 to enable prediction of a loss of the light intensity in the incidence optical system LA. With this arrangement, the same effect as that of the second Embodiment discussed above, is obtained.

Herein, let $I_0(\lambda)$ be an emission light intensity of the semiconductor laser 1, and let $T(\lambda)$ be the transmittance of the correction plate 19. An incidence light intensity $I(\lambda)$ to the light intensity detection sensor 14 is given such as:

$$I(\lambda)=T(\lambda)\times I_0(\lambda). \quad (2)$$

Further, supposing that the laser wavelength changes due to a change of an ambient temperature, the incidence light intensity $I(\lambda)$ becomes such as:

$$I(\lambda_1)=T(\lambda_1)\times I_0(\lambda_1). \quad (3)$$

Herein, when performing the APC operation so that the incidence light intensity $I(\lambda)$ to the light intensity detection sensor 14 is always constant without depending on $\lambda$, the following formula is established.

$$I(\lambda)=T(\lambda)\times I_0(\lambda)=I(\lambda_1)=T(\lambda_1)\times I_0(\lambda_1)$$

$$\therefore I_0(\lambda_1)=\{T(\lambda)/T(\lambda_1)\}\times I_0(\lambda). \quad (4)$$

The light intensity of the light incident on the photosensitive drum surface 8 is corrected so as to correct the spectral transmittance characteristic of the glass material.

The glass material and the thickness of the correction plate 19 are selected so as to be substantially the same as or proportional to the fluctuation in the transmittance of the whole system with respect to the fluctuation in the wavelength. The correction plate 19 is disposed, whereby even when the wavelength of the semiconductor laser 1 fluctuates, the light intensity on the surface of the light intensity detection sensor 14 is substantially equalized to the light intensity on the photosensitive drum surface 8. Hence, the light intensity on the photosensitive drum surface 8 can be substantially made constant by performing the APC operation. Even if unable to obtain the glass material having the desired spectral transmittance characteristic, a free design can be attained by use of a dielectric multi-layered film, and hence, the transmittance of the correction plate can be matched with the spectral transmittance required.

It should be noted that the third Embodiment involves employing the correction plate 19, however, for example, a detection sensitivity of the light intensity detection sensor 14 may be set so as to be substantially the same as or proportional to the fluctuation in the transmittance of the whole system with respect to the fluctuation in the wavelength.

Figure 11:
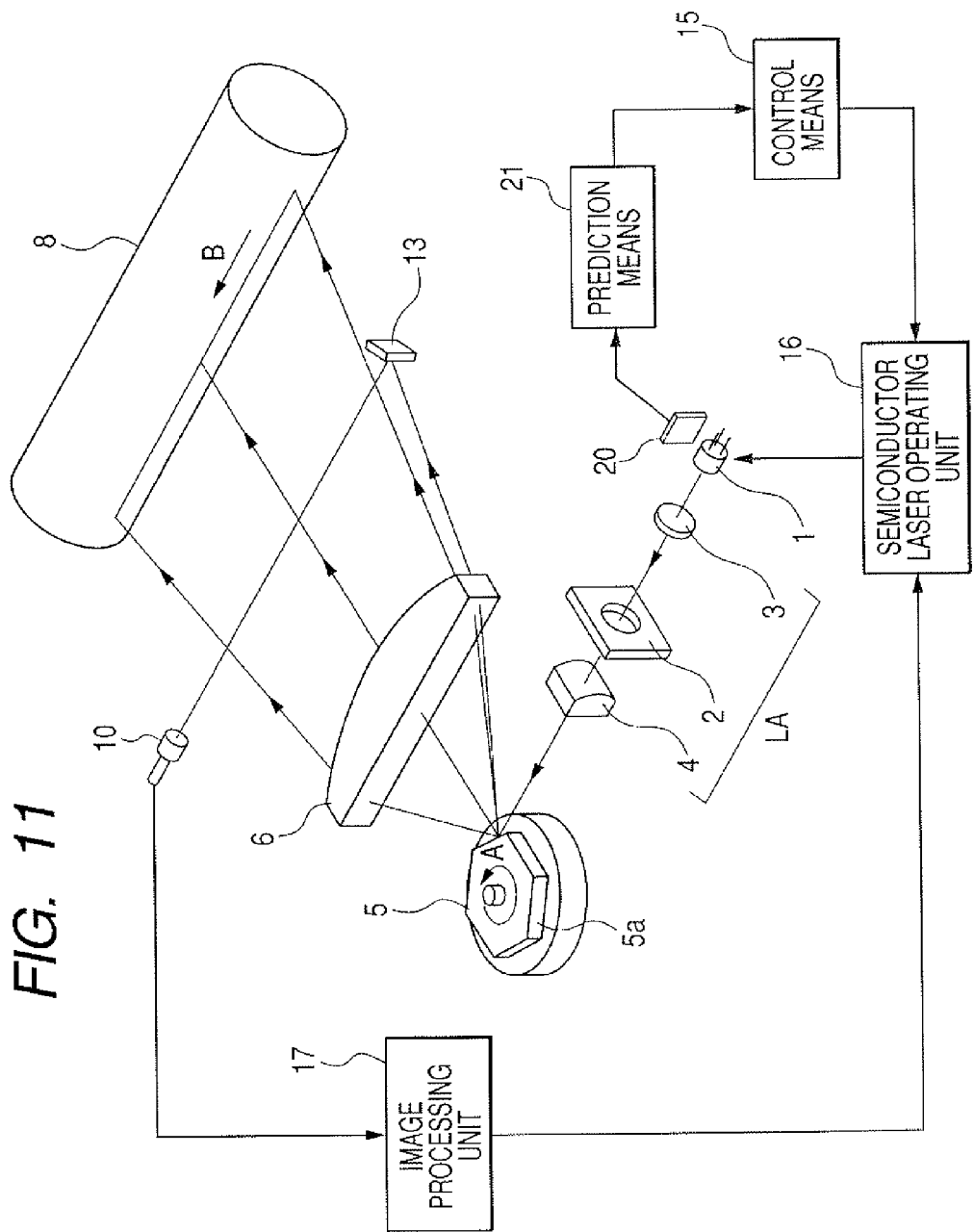
FIG. 11 is a principal schematic view in the third Embodiment of the present invention.

Moreover, as depicted in FIG. 11, a temperature sensor 20 for measuring in real-time a change of the temperature is disposed in the vicinity of the semiconductor laser 1. Then, when a change of the temperature is detected from an output signal transmitted from the temperature sensor 20, a prediction means 21 predicts the fluctuation in the spectral transmittance of each of the incidence optical system LA and the imaging optical system 6, which is caused as the concomitant of the fluctuation in the wavelength of the light beams emitted from the semiconductor laser 1.

Then, the control means 15 controls the output of the semiconductor laser 1 on the basis of the signal transmitted from the prediction means 21. The configuration being thus made, the same effect as in the third Embodiment discussed above is obtained.

Note that the third Embodiment has exemplified the APC operation regarding the use of a single light source, however, the APC operation is the same with respect to a plurality of light sources, and is conducted in a way that lets the light beams through the correction plate 19 for every light source, whereby a scatter in density in each of the plural light sources is restrained.

Fourth Embodiment

Figure 12:
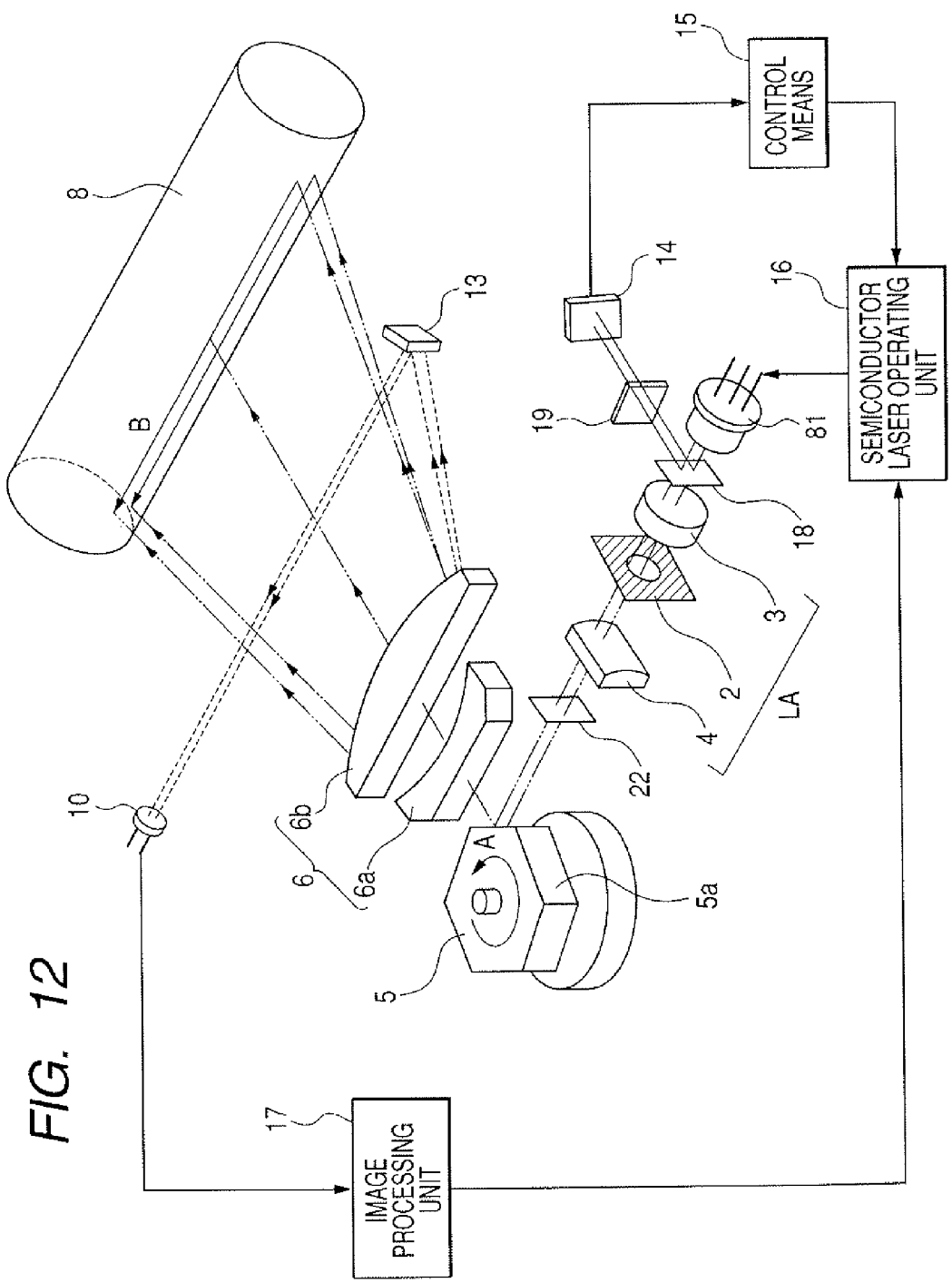
FIG. 12 is a principal schematic view in a fourth Embodiment of the present invention.

FIG. 12 is a principal schematic view of the light scanning apparatus in a fourth Embodiment of the present invention. The same components as those depicted in FIG. 1 are marked with the same numerals in FIG. 12.

A different point of the fourth Embodiment from the first Embodiment discussed above is that a light source means 81 is constructed of a vertical cavity surface emitting laser (VCSEL), and a wavelength fluctuation correction plate 22 is provided in the light path between the light source means 81 and the light deflector 5. Other configurations and optical action are substantially the same as those in the first Embodiment.

In FIG. 12, reference numeral 81 designates the light source means having a plurality of light emitting points (light emitting elements). For instance, the light source means 81 is constructed of the vertical cavity surface emitting laser of such a type that the wavelength of the plurality of light beams is equal to or less than 450 nm.

Reference numeral 22 represents the wavelength fluctuation correction plate. The wavelength fluctuation correction plate 22 is made from a material having a spectral transmittance distribution reversed to the spectral transmittance distributions of the incidence optical system LA and of the imaging optical system 6 in a fluctuation area of the wavelength of the light beams emitted from the light source means 81.

Moreover, the wavelength fluctuation correction plate 22 has a spectral transmittance distribution that reduces a difference in light intensity between the light beams when the respective light beams become incident on the scanned surface, even when there is a difference in wavelength between the light beams emitted from the plurality of light emitting elements of the light source means 81.

In the fourth Embodiment, the plurality of divergent light beams emitted from the vertical cavity surface emitting laser 81 are converted into convergent light beams by the first lens 3. Thereafter, the light beams are reshaped into a desired beam shape by the aperture stop 2 and then become incident upon the cylindrical lens 4. The intra-main-scanning-section light beams incident upon the cylindrical lens 4 emerge from the cylindrical lens 4 in an as-is state. Further, within the subscanning section, the light beams are converged and then imaged substantially as a line image on the deflecting surface 5a of the light deflector 5.

Then, the plurality of light beams reflected in deflection by the deflecting surface 5a of the light deflector 5 are imaged in spot shapes on the photosensitive drum surface 8 by the imaging optical system 6.

The photosensitive drum surface 8 is scanned by the plurality of light beams at an equal speed in the direction of the arrowhead B in a way that rotates the light deflector 5 in the direction of the arrowhead A. Thus, the photosensitive drum surface 8 is scanned simultaneously by the plurality of scanning lines, thereby recording the image.

At this time, the BD sensor 10 is provided for adjusting the timing of starting at the image formation, before scanning the photosensitive drum surface 8 with the light spots. The BD sensor 10 receives the BD light beams defined as part of the light beams reflected in deflection by the light deflector 5, i.e., the light beams when scanning the area excluding the image forming area before scanning the image formation area on the photosensitive drum surface 8. The BD light beams are reflected by the BD mirror 13, then converged by the BD lens (not shown) and are incident upon the BD sensor 10. Then, the BD signal (the synchronous signal) is detected from the output signal of this BD sensor 10, and the image recording start timing on the photosensitive drum surface 8 is adjusted based on this BD signal.

Herein, since there might be a possibility of expending a tremendous length of time if the APC operation is conducted by individually detecting the light intensity while causing each of the plurality of light emitting elements to emit the light, generally, the light intensity is detected by picking up one or several light emitting elements.

If each individual light emitting element of the vertical cavity surface emitting laser has a scatter in wavelength, however, it follows that the light intensity on the photosensitive drum surface 8 differs at each light emitting element, due to a difference in the transmittance of the glass material with respect to the wavelength.

Such being the case, the fourth Embodiment solves the above-mentioned problem by providing, as depicted in FIG. 12, the wavelength fluctuation correction plate 22 in the light path between the cylindrical lens 4 and the light deflector 5. The wavelength fluctuation correction plate 22 is made from a material having a spectral transmittance distribution reversed to the spectral transmittance distributions of the incidence optical system LA, and of the imaging optical system 6, in the fluctuation area of the wavelength of the light beams emitted from the vertical cavity surface emitting laser 81.

Besides, the wavelength fluctuation correction plate 22 has the spectral transmittance distribution that reduces the difference in light intensity between the light beams when the respective light beams become incident on the scanned surface even if there is a difference in wavelength between the light beams emitted from the plurality of light emitting elements of the vertical cavity surface emitting laser 81.

Figure 13:
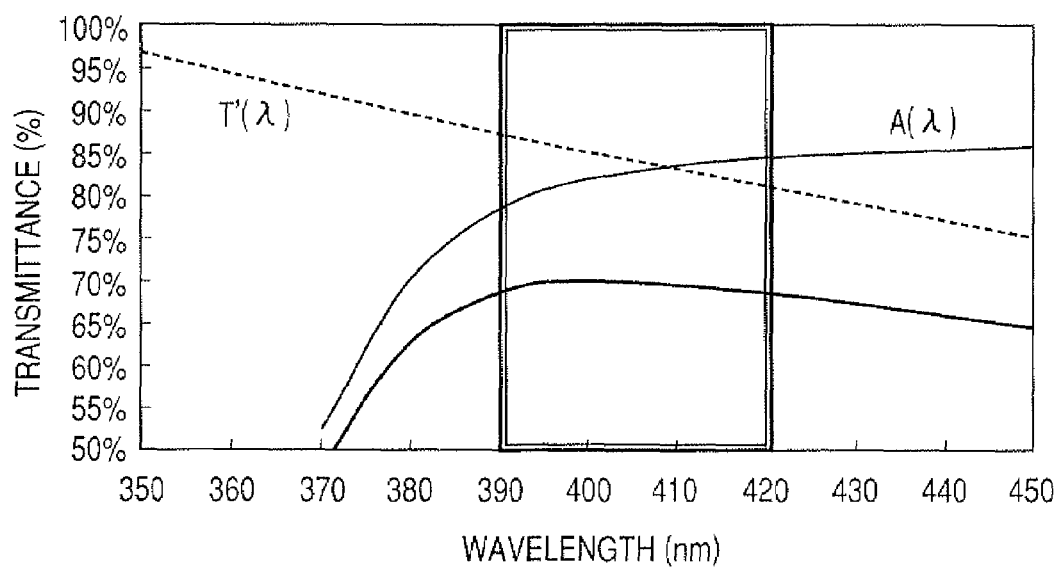
FIG. 13 is an explanatory diagram showing how to perform correction by use of a transmittance correction plate in a fourth Embodiment of the present invention.

FIG. 13 shows a transmittance characteristic of the wavelength fluctuation correction plate 22. Further, Table 5 shows a film material and a film thickness of the dielectric multilayered film in the wavelength fluctuation correction plate 22 in the fourth Embodiment.

TABLE 5

|  | film material | film thickness (nm) |
| --- | --- | --- |
| base material | s-bs17 (OHARA) | — |
| first layer | ZrO$_2$ | 150 |
| second layer | MgF$_2$ | 200 |

A spectral transmittance distribution T'(λ) of the wavelength fluctuation correction plate 22 has, when letting A(λ) be a spectral transmittance distribution after passing through all the glass materials, the following characteristic as indicated by a bold solid line in a wavelength scatter range (which is an area encompassed by a frame in the Figure) of the respective light emitting elements:

$$T'(\lambda) = \text{const.}/A(\lambda). \quad (5)$$

Accordingly, even when there is the scatter in the wavelength of the vertical cavity surface emitting laser 81, the light intensity on the photosensitive drum surface 8 can be made substantially constant by the transmission through the wavelength fluctuation correction plate 22. It is feasible to match with the spectral transmittance that can meet the relational expression (5), because of attaining the free design owing to the dielectric multi-layered film.

The fourth Embodiment has exemplified the vertical cavity surface emitting laser. Without being limited to this vertical cavity surface emitting laser, however, the spectral transmittance characteristic of the wavelength fluctuation correction plate 22 may be determined corresponding to the scatter in the wavelength also with respect to a system configured by, e.g., a plurality of light sources (lasers).

(Image Forming Apparatus)

Figure 14:
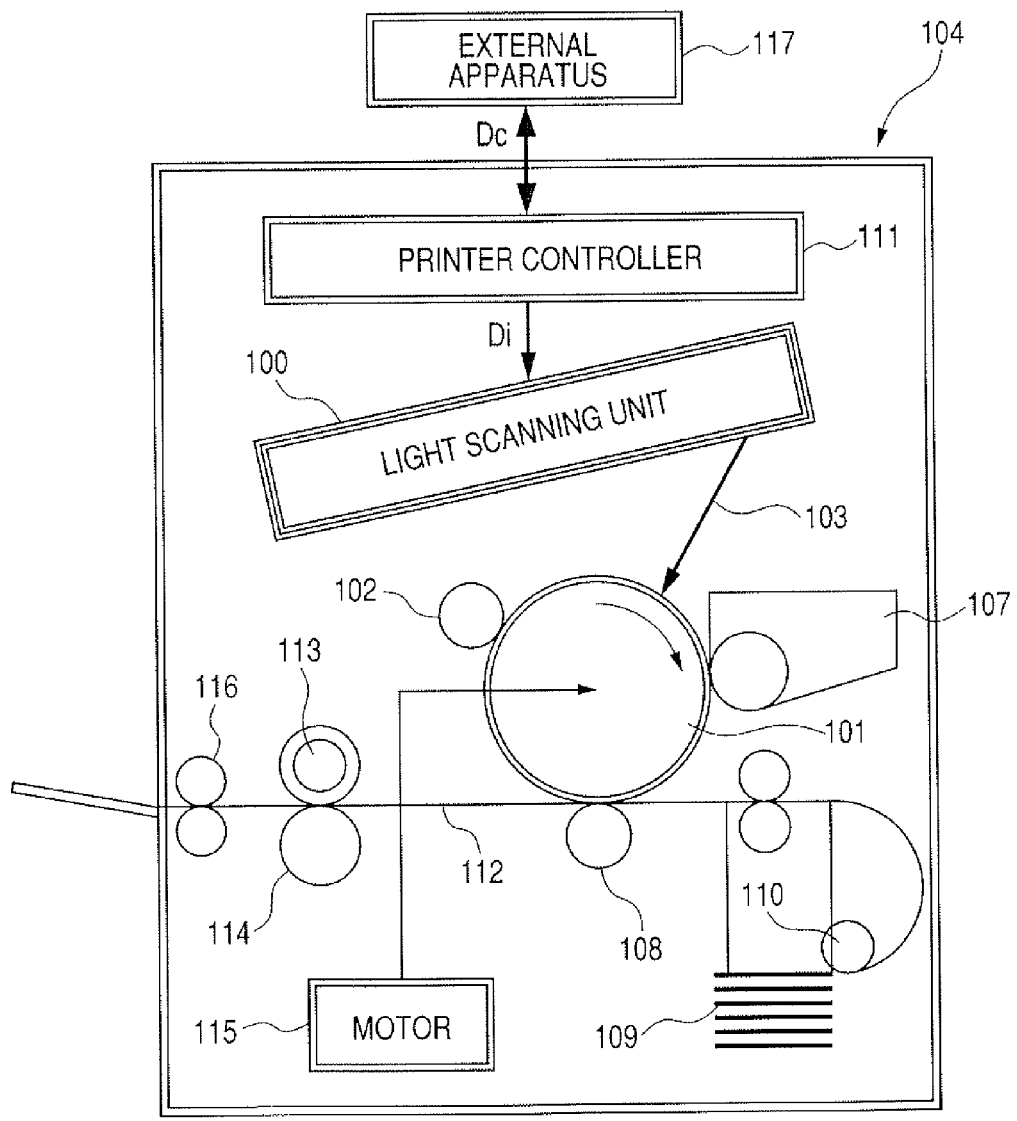
FIG. 14 is a view showing a subscanning section, illustrating an Embodiment of an image forming apparatus of the present invention.

FIG. 14 is a principal sectional view taken in the subscanning direction, showing an Embodiment of an image forming apparatus according to the present invention. In FIG. 14, reference numeral 104 represents the image forming apparatus. Code data Dc is inputted to this image forming apparatus 104 from an external apparatus 117, such as a personal computer. The code data Dc is converted into image data (dot data) Di by a printer controller 111 within the apparatus. This image data Di is inputted to a light scanning unit 100 having a configuration illustrated in any one of the first through fourth Embodiments. Then, a light beam 103, which is modulated corresponding to the image data Di, is emitted from this light scanning unit 100, and a photosensitive surface of a photosensitive drum 101 is scanned by this light beam 103 in the main scanning direction.

The photosensitive drum 101, defined as an electrostatic latent image bearing body (photosensitive body), is rotated clockwise by a motor 115. Then, with this rotation, the photosensitive surface of the photosensitive drum 101 moves in the subscanning direction orthogonal to the main scanning direction with respect to the light beam 103. A charging roller 102, which uniformly charges the surface of the photosensitive drum 101 with electricity, is so provided as to abut the surface thereof. Then, the surface of the photosensitive drum 101, charged by the charging roller 102, is irradiated with the light beam 103 used for scanning by the light scanning unit 100.

As explained earlier, the light beam 103 is modulated based on the image data Di. An electrostatic latent image is formed on the surface of the photosensitive drum 101 by irradiating this surface with the light beam 103. This electrostatic latent image is developed into a toner image by a developing unit 107 disposed so as to abut the photosensitive drum 101, on a more downstream side in the rotating direction of the photosensitive drum 101, than the irradiating position of the light beam 103.

The toner image developed by the developing unit 107 is transferred onto a sheet 112 defined as a transferred material by a transfer roller 108 disposed downwardly of the photosensitive drum 101 in a face-to-face relationship with the photosensitive drum 101. Normally, the sheets 112 are stored in a sheet cassette 109 provided in front (on the right side in FIG. 14) of the photosensitive drum 101. The sheets 112 can be fed manually. A sheet feed roller 110 is provided at an edge portion of the sheet cassette 109 and conveys the sheets 112 within the sheet cassette 109 to a conveyance path.

The sheet 112 undergoing the transfer of the not-yet-fixed toner image in the manner described above is further conveyed to a fixing unit provided in the rear (on the left side in FIG. 14) of the photosensitive drum 101. The fixing unit is constructed of a fixing roller 113 including a fixing heater (not shown), provided inside, and a pressurizing roller 114 disposed so as to be press-fitted to the fixing roller 113.

The sheet 112 conveyed from the transfer unit is heated while being pressurized at a press-contact portion between the fixing roller 113 and the pressurizing roller 114, thereby fixing the not-yet-fixed toner image onto the sheet 112. Further, a sheet discharge roller 116 is disposed posterior to the fixing roller 113 and discharges the image-fixed sheet 112 outside the image forming apparatus.

The printer controller 111, though not illustrated in FIG. 14, controls the respective components represented by the motor 115 within the image forming apparatus and the polygon motor within the light scanning unit, which will be described later, as well as converting the data explained earlier.

A recording density of the image forming apparatus employed in the present invention is not particularly limited. Considering that a higher image quality is requested of the apparatus as the recording density becomes higher, however, the first through fourth Embodiments of the present invention exhibit more of the effects in the image forming apparatus that is equal to or greater than 1200 dpi in recording density.

(Color Image Forming Apparatus)

Figure 15:
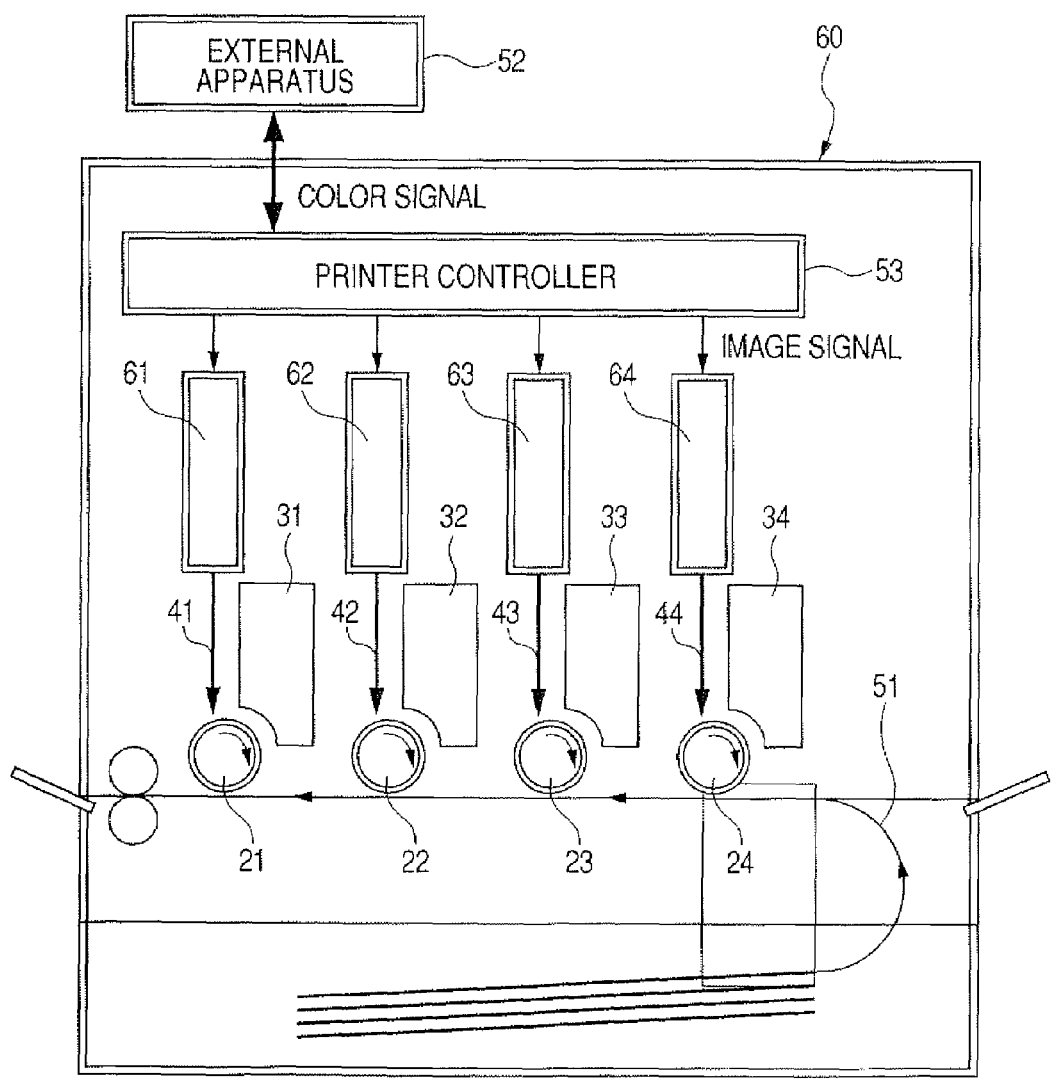
FIG. 15 is a principal schematic view showing a color image forming apparatus in an Embodiment of the present invention.
Figure 16:
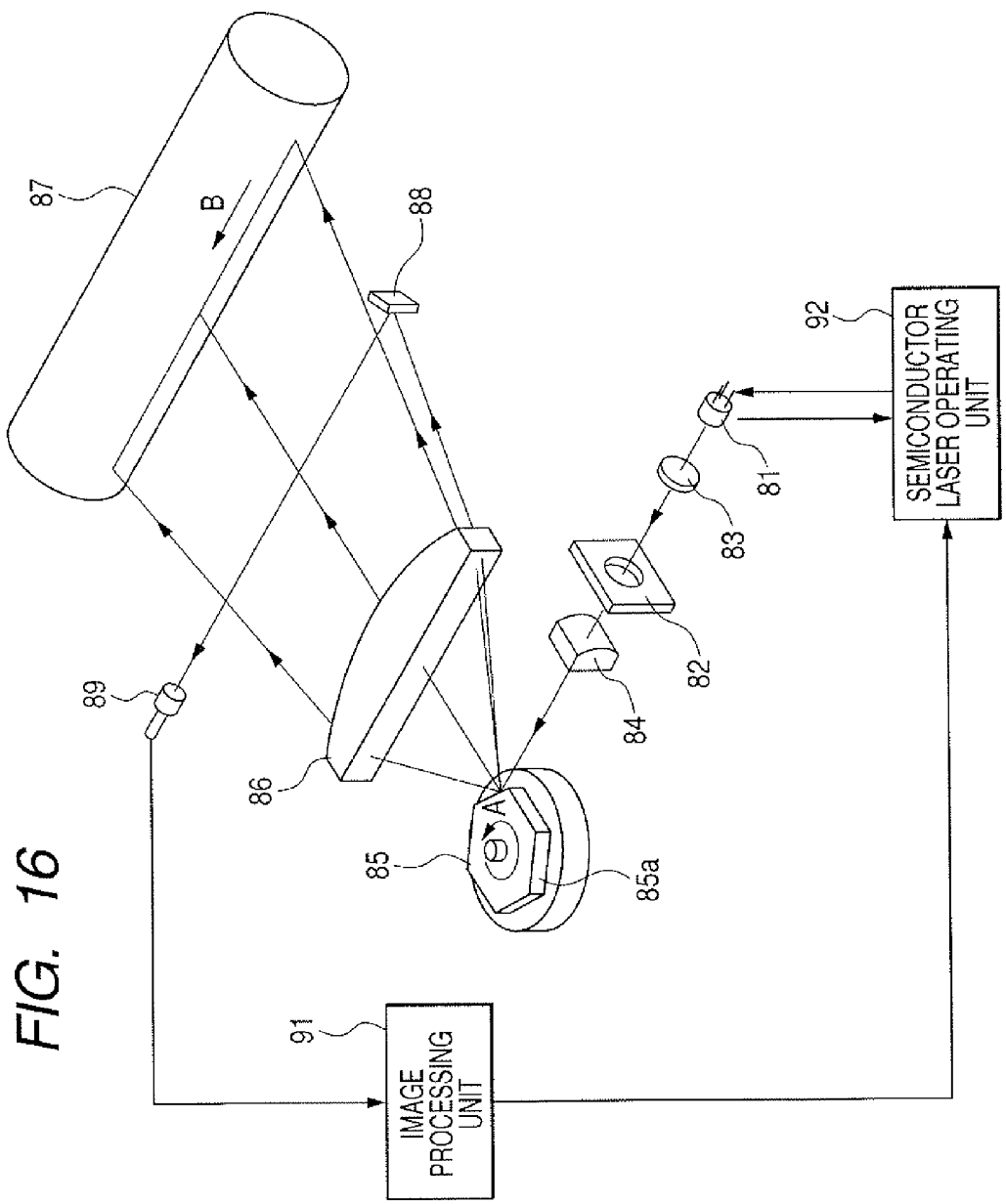
FIG. 16 is a principal schematic view of a conventional light scanning apparatus.
Figure 17:
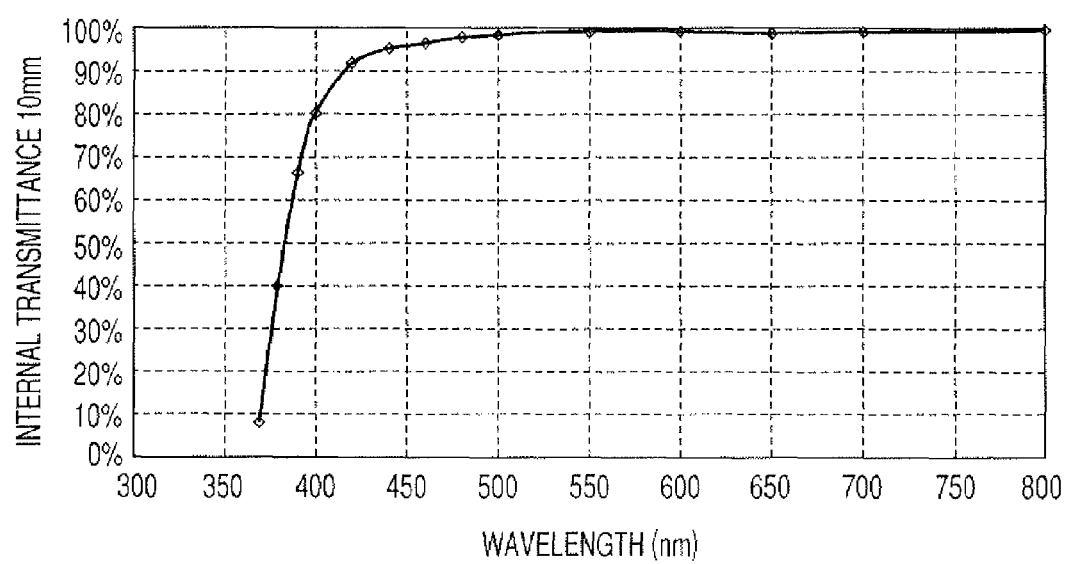
FIG. 17 is a graphic chart showing a transmittance characteristic of a glass material with respect to a wavelength.

FIG. 15 is a principal schematic view of a color image forming apparatus in an Embodiment of the present invention. The present Embodiment exemplifies a tandem type of color image forming apparatus, wherein four pieces of light scanning apparatuses are arranged in a side-by-side relationship and record the image information in parallel on the photosensitive drum surface defined as an image bearing body.

In FIG. 15, reference numeral 60 designates the color image forming apparatus, and reference numerals 61, 62, 63, 64 represent the light scanning apparatuses having any one of the configurations shown in the first through fourth Embodiments.

Reference numerals 21, 22, 23, 24 denote the photosensitive drums each defined as the image bearing body, reference numerals 31, 32, 33, 34 stand for developing unit, and reference numeral 51 represents a conveyance belt.

In FIG. 15, respective color signals of R (red), G (green) and B (blue) are inputted to the color image forming apparatus 60 from an external apparatus 52, such as a personal computer. These color signals are converted by the intra-apparatus printer controller 53 into image data (dot data) of C (cyan), M (magenta), Y (yellow) and B (black). The image data are inputted to the light scanning apparatuses 61, 62, 63, 64, respectively. Then, light beams 41, 42, 43, 44, modulated corresponding to the image data, are emitted from these light scanning apparatuses, and scan the photosensitive surfaces of the photosensitive drums 21, 22, 23, 24 in the main scanning direction.

In the color image forming apparatus in the present Embodiment, the four light scanning apparatuses (61, 62, 63, 64) are arranged corresponding to C (cyan), M (magenta), Y (yellow) and B (black). The respective light scanning apparatuses record the image signals (image information) on the surfaces of the photosensitive drums 21, 22, 23, 24.

In the color image forming apparatus in the present Embodiment, as described above, the four light scanning apparatuses 61, 62, 63, 64 form the respective latent color images on the surfaces of the photosensitive drums 21, 22, 23, 24 corresponding thereto by use of the light beams based on the image data.

Thereafter, the images are multiplex-transferred onto the recording material, thereby forming a single sheet of full-color image.

The external apparatus 52 may involve using, for example, a color image reading apparatus including a CCD sensor. In this case, a color digital copying machine is constructed of this color image reading apparatus and the color image forming apparatus 60.

As many apparently widely different embodiments of the present invention can be made without departing from the sprit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light scanning apparatus comprising:
a semiconductor laser which emits a light beam having a wavelength equal to or less than 450 nm;
an incidence optical system which makes the light beam, emitted from said semiconductor laser, incident on a deflection means for scanning in deflection;
an imaging optical system which images the light beam scanned in deflection by said deflection means to a surface to be scanned;
light intensity detection means which detects fluctuations in spectral transmittances of said incidence optical system and of said imaging optical system, which are caused as a concomitant of a fluctuation in wavelength of the light beam which is emitted from said semiconductor laser and passes through said incident optical system and said imaging optical system; and
automatic power control means which automatically controls a light emission output of said semiconductor laser on the basis of a detection value detected by said light intensity detection means.

2. A light scanning apparatus according to claim 1, wherein said light intensity detection means is disposed in a position conjugate to the scanned surface.

3. An image forming apparatus comprising:
a light scanning apparatus according to claim 1;
a photosensitive body which is disposed on the scanned surface;
a developing unit which develops, as a toner image, an electrostatic latent image formed on said photosensitive body by light beams used for scanning by said light scanning apparatus;
a transfer unit which transfers the developed toner image onto a transferred material; and
a fixing unit which fixes the transferred toner image onto the transferred material.

4. An image forming apparatus according to claim 3, further comprising a printer controller which converts code data inputted from an external apparatus into an image signal and inputs the image signal to said light scanning apparatus.

5. A light scanning apparatus according to claim 1, wherein said imaging optical system includes a plastic lens.

6. An image forming apparatus comprising:
a light scanning apparatus according to claim 5;
a photosensitive body which is disposed on the scanned surface;
a developing unit which develops, as a toner image, an electrostatic latent image formed on said photosensitive body by light beams used for scanning by said light scanning apparatus;
a transfer unit which transfers the developed toner image onto a transferred material; and
a fixing unit which fixes the transferred toner image onto the transferred material.

7. An image forming apparatus according to claim 6, further comprising a printer controller which converts code data inputted from an external apparatus into an image signal and inputs the image signal to said light scanning apparatus.

8. A light scanning apparatus comprising:
a semiconductor laser which emits a light beam having a wavelength equal to or less than 450 nm;
deflection means which uses the light beam, for scanning in deflection, emitted from said light source means;
an incidence optical system which makes the light beam emitted from said semiconductor laser incident on said deflection means;
an imaging optical system which images the light beam scanned in deflection by said deflection means to a surface to be scanned;
light splitting means which splits part of the light beam emitted from said semiconductor laser;
light intensity detection means which detects a light intensity of one flux of the light beam split by said light splitting means;
automatic power control means which automatically controls a light emission output of said semiconductor laser on the basis of a detection value detected by said light intensity detection means; and
a correction plate which is disposed between said light splitting means and said light intensity detection means, wherein said correction plate has an optical characteristic that is the same as or proportional to fluctuations of spectral transmittances of said incidence optical system and of said imaging optical system, which are caused as a concomitant of a fluctuation in wavelength of the light beam emitted from said semiconductor laser.

9. An image forming apparatus comprising:
a light scanning apparatus according to claim 8;
a photosensitive body which is disposed on the scanned surface;
a developing unit which develops, as a toner image, an electrostatic latent image formed on said photosensitive body by light beams used for scanning by said light scanning apparatus;
a transfer unit which transfers the developed toner image onto a transferred material; and
a fixing unit which fixes the transferred toner image onto the transferred material.

10. An image forming apparatus according to claim 9, further comprising a printer controller which converts code data inputted from an external apparatus into an image signal and inputs the image signal to said light scanning apparatus.

11. A light scanning apparatus comprising:
a semiconductor laser which has a plurality of light emitting elements for emitting light beams having a wavelength equal to or less than 450 nm;
deflection means which uses the light beams, for scanning in deflection, emitted from said semiconductor laser;
an incidence optical system which directs the light beams emitted from said semiconductor laser on said deflection means;
an imaging optical system which images the light beams scanned in deflection by said deflection means to a surface to be scanned; and
a wavelength fluctuation correction plate which is disposed in a light path between said semiconductor laser and said deflection means,
wherein said wavelength fluctuation correction plate is made from a material having a spectral transmittance distribution for suppressing a difference in the light intensity between light beams incident into said surface to be scanned when there is a difference in the wavelength between the light beams emitted from said semiconductor laser.

12. An image forming apparatus comprising:
a light scanning apparatus according to claim 11;
a photosensitive body which is disposed on the scanned surface;
a developing unit which develops, as a toner image, an electrostatic latent image formed on said photosensitive body by light beams used for scanning by said light scanning apparatus;
a transfer unit which transfers the developed toner image onto a transferred material; and
a fixing unit which fixes the transferred toner image onto the transferred material.

13. An image forming apparatus according to claim 12, further comprising a printer controller which converts code data inputted from an external apparatus into an image signal and inputs the image signal to said light scanning apparatus.

14. A light scanning apparatus comprising:
a semiconductor laser which emits a light beam having a wavelength equal to or less than 450 nm;
an incidence optical system which makes the light beam, emitted from said semiconductor laser, incident on a deflection means for scanning in deflection;
an imaging optical system which images the light beam scanned in deflection by said deflection means to a surface to be scanned;
a temperature sensor which detects a temperature of said semiconductor laser;
prediction means which predicts the fluctuations in the spectral transmittances of said incidence optical system and of said imaging optical system, which are caused as the concomitant of the fluctuation in the wavelength of the light beams emitted from said semiconductor laser on the basis of an output signal from said temperature sensor, and outputs a prediction signal; and
automatic power control means which automatically controls the output of said light source means on the basis of the prediction signal from said prediction means.

15. An image forming apparatus comprising:
said light scanning apparatus according to claim 14;
a photosensitive body which is disposed on the scanned surface;
a developing unit which develops, as a toner image, an electrostatic latent image formed on said photosensitive body by light beams used for scanning by said light scanning apparatus;
a transfer unit which transfers the developed toner image onto a transferred material; and
a fixing unit which fixes the transferred toner image onto the transferred material.

16. An image forming apparatus according to claim 15, further comprising a printer controller which converts code data inputted from an external apparatus into an image signal and inputs the image signal to said light scanning apparatus.

17. A light scanning apparatus comprising:
a semiconductor laser which emits a light beam having a wavelength equal to or less than 450 nm;
an incidence optical system which makes the light beam, emitted from said semiconductor laser, incident on a deflection means for performing scanning in deflection;
an imaging optical system which images the light beam scanned in deflection by said deflection means to a surface to be scanned;
light intensity detection means which detects fluctuations in spectral transmittances of said incidence optical system, which are caused as a concomitant of a fluctuation in wavelength of the light beam which is emitted from said semiconductor laser and passes through said incident optical system; and
automatic power control means which automatically controls a light emission output of said semiconductor laser on the basis of a detection value detected by said light intensity detection means.

* * * * *